(12) United States Patent
Sonoda et al.

(10) Patent No.: US 6,433,852 B1
(45) Date of Patent: Aug. 13, 2002

(54) LIQUID CRYSTAL DISPLAY DEVICE HAVING A SPACER

(75) Inventors: Hidehiro Sonoda; Masahito Ohe; Hiroaki Asuma; Shigeru Matsuyama, all of Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/453,575

(22) Filed: Dec. 3, 1999

(30) Foreign Application Priority Data

Dec. 3, 1998 (JP) .......................................... 10-344420
Jan. 7, 1999 (JP) .......................................... 11-002059

(51) Int. Cl.$^7$ .......................................... G02F 1/1343
(52) U.S. Cl. ...................................... 349/156; 349/141
(58) Field of Search ................................ 349/155, 156, 349/141; 6/141

(56) References Cited

U.S. PATENT DOCUMENTS 5,643,471 A * 7/1997 Onishi et al. .................. 216/23
5,748,266 A * 5/1998 Kodate .......................... 349/39
6,016,181 A * 1/2000 Shimada ...................... 349/156
6,177,974 B1 * 1/2001 Hirakata et al. ............ 349/155

FOREIGN PATENT DOCUMENTS

JP 08-146447 * 6/1996

* cited by examiner

Primary Examiner—Kenneth Parker
(74) Attorney, Agent, or Firm—Antonelli, Terry, Stout & Kraus, LLP

(57) ABSTRACT

To provide a transverse electric field liquid crystal display device which eliminates the leakage of light and suppresses the disturbance of the electric field between the electrodes, thus enabling an image display of high quality, a liquid crystal display device has a liquid crystal panel which provides at least two kinds of color filters FIL(R), FIL(G) . . . of different colors and a black matrix BM interposed between said respective color filters on one substrate SUB2, a group of electrodes PX, CT, CT1, CT2, SD2 . . . for selecting pixels formed on the other substrate SUB1, a liquid crystal layer LC made of a liquid crystal composition sandwiched between the substrates and having a dielectric anisotropy, a polarizing plate POL1, POL2 laminated on an outer surface of at least one of the substrates, and drive means which applies drive voltages for display to a group of the electrodes. The liquid crystal display device further includes spacers SP which bridge a gap defined between opposing inner surfaces of the pair of substrates. The spacers SP are formed by bringing top portions of a protrusion SP1 having a specific resistance of less than $10^8$ Ω·cm which is formed on one substrate SUB2 side and a protrusion SP2 having a specific resistance of not less than $10^8$ Ω·cm which is formed on the other substrate SUB1 side into contact with each other.

7 Claims, 18 Drawing Sheets

LIQUID CRYSTAL DISPLAY DEVICE HAVING A SPACER

BACKGROUND OF THE INVENTION

This invention relates to a liquid crystal display device, and more particularly, to a liquid crystal display device of the active matrix type in which the axis of liquid crystal molecules is controlled by applying an electric field substantially in parallel with a substrate inside of a surface of the display panel, thereby providing a wide viewing angle and a high image quality simultaneously. This invention also relates to a liquid crystal display device having spacers of a novel constitution which assure a constant distance between a pair of substrates between which a liquid crystal composition is provided.

Liquid crystal display devices have been widely used as display devices for notebook type computers and computer monitors which are capable of producing a color display of high definition.

Such liquid crystal display devices are roughly classified into two systems. In the liquid crystal display device of one system (a simple matrix type liquid crystal device), a liquid crystal composition is substantially sandwiched between opposing faces of at least two substrates with at least one substrate being made of transparent glass, thus constituting a so-called liquid crystal panel, and a voltage is selectively applied to various pixel forming electrodes formed on the substrate of the liquid crystal panel so as to turn on or off given pixels. In the liquid crystal display device of the other system (active matrix liquid crystal display device), the above-mentioned various electrodes are provided with active elements for selecting pixels and given pixels are turned on or off by selecting these active elements.

The active matrix liquid crystal display device is represented by a liquid crystal display device which uses thin film transistors (TFT) as active elements. The liquid crystal display devices using the thin film transistors have been widely used as display terminal monitors of OA equipment, since the devices are thin and light-weight and exhibit a high image quality equivalent to that of cathode ray tubes.

In view of the difference in the method of driving the liquid crystal, the display system of the liquid crystal display devices is roughly classified into two types. In one display system, the liquid crystal composition is sandwiched by two substrates constituted by transparent electrodes and is driven by a voltage applied to the transparent electrodes, and light incident upon the liquid crystal composition layer after being transmitted through the transparent electrodes is modulated to provide the display. Most of the products that are now available have adopted this system.

Another one is a system in which the liquid crystal composition is driven by an electric field which is nearly parallel with the surface of a substrate, being generated between two electrodes that are formed on the same substrate, and light incident upon the liquid crystal composition layer through a gap between the two electrodes is modulated to provide a display. This system is characterized by its remarkably wide viewing angle and is an extremely prominent system in connection with the active matrix liquid crystal display device. Features of the latter system have been disclosed in, for example, Japanese Publication of the Translation of International Patent Application No. 505247/1993, Japanese Patent Publication No. 21907/1988 and Japanese Patent Laid-open No. 160878/1994. Hereinafter, the liquid crystal display device of this system will be referred to as a transverse electric field liquid crystal display device.

FIG. 17 is a cross sectional view of an essential part of a display panel showing how an electric field is generated by the transverse electric field liquid crystal display device. In this liquid crystal display device, a video signal line DL, a counter electrode CT and a pixel electrode Px are formed on one substrate SUB1. The liquid crystal display device includes an orientation control layer ORI1, which is formed on the interface between a protective film PSV, formed on upper layers of the video signal line DL, the counter electrode CT and the pixel electrode PX, and a layer of a liquid crystal composition LC. On the other substrate SUB2, there are color filters FIL, defined by a black matrix BM, an overcoat film OC, which is formed such that it covers upper layers of these color filters FIL and the black matrix BM and is formed so as to prevent the constituting members of color filters and the black matrix from affecting the liquid crystal composition (hereinafter called liquid crystal simply), and an orientation control layer ORI2 which is formed on an interface between the overcoat layer OC and the layer of the liquid crystal LC.

Insulation films GI and AOF are formed on the one substrate SUB1, a video signal line DL is made of conductive films d1 and d2, a counter electrode CT is made of a conductive film g1, and the pixel electrode PX is made of a conductive film g2.

The distance between the pair of substrates SUB1, SUB2 (the thickness of the layer of the liquid crystal: cell gap) is, in general, set to a given value by arranging spherical spacers (not shown in drawings) in a distributed manner between both substrates. Although polarizing plates are provided on the outer surfaces of the substrate SUB1 and the substrate SUB2, they are omitted from the drawings.

Although no relevancy is found with the transverse electric field liquid crystal display device, Japanese Patent Laid-open No. 73088/1997 discloses the use of conical spacers which are fixedly formed on a protective film of a color filter substrate in place of such spherical spacers, or conical spacers, which are fixedly formed by laminating color filters.

In FIG. 17, the orientation direction of molecules of the liquid crystal LC is controlled in response to the electric field, which is generated between the pixel electrode PX and the counter electrode CT nearly in parallel with the substrates so as to provide, an image display. Here, however, an electric field which does not contribute to the display is generated between the video signal, line DL and the counter electrode CT. In case the gap between these electrodes is too narrow, the intensity of the electric field between the video signal line DL and the counter electrode CT is strengthened, and, hence, the liquid crystal LC is driven and an undesirable light is transmitted through the liquid crystal.

Although the black matrix BM is positioned in a region defined between these electrodes, in case the optical density of the black matrix BM is low, the above mentioned transmitting light cannot be shielded completely, and, hence, a leakage of light occurs. This leakage of light gives an adverse influence on the quality of the display, such as the lowering of the contrast or the occurrence of crosstalk. To solve such problems, it becomes necessary to increase the distance between the above-mentioned electrodes or to increase the optical density of the black matrix BM. Although FIG. 17 shows the case where the video signal line DL and the counter electrode CT are arranged close to each other, similar problems also occur in case the video signal line DL and the picture electrode PX are arranged close to each other.

FIG. 18 is a schematic cross sectional view showing an example of an arrangement of electrodes which form one pixel of a liquid crystal panel constituting a conventional transverse electric field liquid crystal display device. On an active matrix substrate SUB1, there is a pixel electrode PX, counter electrodes CT1, CT2, a drain electrode SD2, an insulation film PSV, an orientation film ORI1 and the like, while on a color filter substrate SUB2, there are a black matrix BM, color filters FIL(R), FIL(G), FIL(B) (not shown in drawings), an overcoat film OC, an orientation film ORI2 and the like. A liquid crystal LC is filled in a gap defined between opposing faces of both substrates. In the drawing, POL1, POL2 denote polarizing plates, E denotes an electric field for selecting a pixel, and E' denotes an undesired electric field.

Upon selection of this pixel, the electric field E is generated between the pixel electrode PX and the counter electrode CT1 and the orientation of the liquid crystal LC is controlled in response to this electric field E and, hence, a so-called lighting condition is obtained. Here, however, there also exists a potential difference between the pixel electrode PX and the neighboring counter electrode CT2 so that an undesired interference electric field E' is generated between them. As a result, a proper electric field is not applied to the liquid crystal of the selected pixel.

A method for applying a proper electric field to the liquid crystal, while preventing electric fields applied in parallel with the substrate from interfering with each other, and corresponding means for achieving a high quality image are disclosed in, for example, Japanese Laid-open No. 160878/1994 and Japanese Laid-open No. 120061/1997.

SUMMARY OF THE INVENTION

As described above, in the transverse electric field liquid crystal display device, a large number of wirings are formed on the active matrix substrates and various electric signals are applied to them with the result that the electric fields interfere with each other. Accordingly, the electric fields applied to the liquid crystals are affected by the undesired electric fields and there arises a case wherein the proper electric fields are not applied to the liquid crystals.

Furthermore, due to an undesired electric capacity which is generated between the electrodes, the voltage applied to the liquid crystal tends to fluctuate. Such a phenomenon becomes a cause of the deterioration of the display quality of the liquid crystal display device.

In particular, the electric field generated by a video signal electrode, which transmits a signal to each pixel having an active element, such as a thin transistor film TFT, affects the electric field between the pixel electrode which operates the liquid crystal and the common electrode. The potential of the video signal electrode is propagated by the image signal and, hence, the potential is always fluctuating during the frame period. For example, in case the pixel electrode (held in a floating condition when the active element is turned off) is arranged close to the video signal electrode, irregularities such as striped shape in parallel with the video signal electrode called smear, which is a crosstalk phenomenon, are generated by the fluctuating potential of the video signal electrode.

To suppress this phenomenon, there has been a technique which arranges a common electrode to which the potential is always applied from the outside as the closest electrode to a video signal electrode (see Japanese Patent Laid-open No. 46916/1994). However, the provision of only this technique is less than optimal to obtain a sufficient electric field shielding effect, and so the problem of smear still exists.

It is estimated that, in a case where the wiring width of the common electrode is widened, the shielding effect is increased and, hence, the smear may be suppressed. The widening of the wiring width, however, brings about a lowering of the aperture rate of the longitudinal display device. To cope with this, Japanese Patent Laid-open No. 120061/1997 discloses a technique in which a light shielding film is provided in parallel with a video signal electrode and this light shielding film is made of a conductive material.

However, portions which are usually formed as light shielding films on the color filter are not constituted merely by portions which are in parallel with the video signal electrode. In the transverse electric field system, there exists a problem in that, in case the conductivity of the light shielding film disposed right above the electric field is high, the electric field applied between the video signal electrode and the common electrode is absorbed by the light shielding film. In an actual fabrication, it is necessary to provide two kinds of light shielding films, wherein one film constitutes a portion which is to be conductive and the other film constitutes a portion which does not need to be conductive. Accordingly, the fabrication steps of the color filter become complicated.

In the liquid crystal display device, it is important to maintain the cell gap (d) between the opposing substrates of the liquid crystal panel at a constant value. In the conventional liquid crystal display device, this is ensured by scattering a large number of spacers, for example, transparent spherical bodies, between the substrates.

When the cell gap 'd' is changed at respective positions of the surface of the substrate, the retardation $\Delta n \cdot d$ (product of the refractive index anisotropy $\Delta n$ and the thickness of the liquid crystal layer, that is, the cell gap d) is changed. This change of the retardation $\Delta n \cdot d$ gives rise to a change in the optical speed of response and the transmission factor of the liquid crystal. Accordingly, when the cell gap 'd' at respective positions of the surface of the substrate is not uniform, the contrast ratio and the chromaticity of the display screen are changed, thus resulting in a lowering of the display quality, which cannot assure the required uniformity of the screen.

To obtain a uniform cell gap, the amount of scattered spacers may be increased. In this case, however, the dispersion of the spacer is difficult and hence, some spacers become coagulated, thus forming a lump, and such lump is scattered, which brings about a display of poor quality. Accordingly, the amount of spacers which can be increased is limited.

Furthermore, in the scattering method, the spacers are arranged at random positions and, hence, they are located at various concaved and convexed portions on the substrate so that there exists a limit in obtaining a uniform cell gap. Still furthermore, the arrangement of the liquid crystal molecules in the vicinity of the spacers is disturbed and, hence, there is a problem that a leakage of light occurs at portions where the arrangement of the liquid crystals is disturbed due to the spacers present in the display region and the black level is lowered due to this leakage of light, thus lowering the contrast.

Furthermore, in case spacers are used, it is required that the thickness of the liquid crystal layer is made uniform in the display surface. In case the thickness is not made uniform sufficiently, it gives rise to irregularities in the luminance in the inside of the display screen due to the irregularities of the thickness of the liquid crystal layer. In forming columnar spacers, it is difficult to form the columnar spacers while making their height uniform. This is due to the method of forming the columnar spacers. In general, the columnar spacers are formed by coating a photosensitive resist on the color filter or the TFT substrate, exposing the resist with the use of a mask and developing the resist, and, hence, the columnar spacers are affected by the coating irregularities, the lighting irregularities and the developing irregularities.

Furthermore, in case the distance between electrodes is widened so as to reduce the intensity of the electric field between the video signal line DL and the counter electrode CT or between the video signal line DL and the pixel electrode PX, the display pixel region or domain inevitably becomes narrow and, hence, the aperture rate is lowered, resulting in a lowering of the luminance and an increase of the power consumption.

On the other hand, there exists a further problem in enhancing the optical density of the black matrix BM. In the transverse electric field liquid crystal display device, the black matrix BM must have a high resistance (see Japanese Patent Laid open No. 43589/1997, for example). This is because the electric characteristics of the black matrix BM affects the formation of the transverse electric field nearly in parallel with the substrate, such that, in case the resistance of the black matrix BM is low, an ideal transverse electric field cannot be formed and problems such as the lowering of the luminance, the lowering of the contrast and the narrowing of the viewing angle occur. To make the black matrix BM have a high resistance, it is desirable to use a pigment dispersed resin resist. Here, however, in case the pigment concentration ratio in the resist is increased so as to increase the optical density of the black matrix BM, the density of the resin is decreased and, hence, the processing ability of the photolithography is deteriorated.

To be more specific, it gives rise to problems such as the lowering of resolution, the lowering of developing margin, and the prompt generation of pigment residue. Furthermore, in case the film thickness of the black matrix BM is made thick so as to increase the optical density, the flatness of the color filter is deteriorated, the rubbing characteristics of the orientation control layer ORI2 is deteriorated, and it becomes difficult to make the thickness of the liquid crystals LC (so-called cell gap) uniform resulting in a poor display quality, such as the deterioration of the speed of response.

Accordingly, it is an object of the present invention to provide a transverse electric field liquid crystal display device in which the above-mentioned problems of the prior art are solved and which is capable of providing an image display of high quality by eliminating the leakage of light caused by spacers and suppressing the disturbance of the electric field between the electrodes.

It is another object of the present invention to provide a liquid crystal display device which can minimize the irregularities of luminance in the inside of a display screen, can prevent lowering of the aperture rate, and can prevent a lowering of the luminance of contrast and the occurrence of crosstalk even when a black matrix of relatively low optical density is used.

Still furthermore, the present invention is characterized by the following constitutions.

In the liquid crystal display device comprising a liquid crystal panel in which at least two kinds of color filters of different colors and a black matrix interposed between respective color filters are provided on one of a pair of substrates with at least one substrate being transparent, and a group of electrodes for selecting pixels is provided on the other of a pair of the transparent substrates, and which further includes a liquid crystal layer made of a liquid crystal composition sandwiched between the pair of substrates and having the dielectric anisotropy, a polarizing plate laminated on an outer surface of at least one of a pair of the substrates, and drive means which applies drive voltages for display to a group of the electrodes, the improvement is characterized in that the liquid crystal display device includes spacers which bridge the gap defined between the opposing inner surfaces of a pair of the substrates, and the specific resistance of one substrate side of the spacers is smaller than the specific resistance of the other substrate side of the spacer.

The spacers are formed by joining top faces of protrusions respectively formed on a pair of the substrates. The specific resistance of one substrate side of the spacer is set to less than $10^8$ $\Omega \cdot cm$ and the specific resistance of the other substrate side of the spacer is set to $10^8$ $\Omega \cdot cm$. The protrusion of one substrate side of the spacer is formed of metal or organic polymer material containing carbon particles and the protrusion of the other substrate side of the spacer is formed of organic polymer based, insulation material.

The spacers according to the present invention are continuously-formed partition-like members or one or a plurality of columnar members which are formed on the side face of the pixel region along the matrix of the black matrix and right below the black matrix. The attrition-like or columnar spacers are constituted by fixedly joining the top faces of the protrusions which are formed on the active matrix substrate and the color filter substrate. The spacers are formed using the process for forming insulation films or the like on the inner surfaces of these substrates. The spacer is provided with a portion at the protrusion side of the color filter substrate side which has a smaller specific resistance than the protrusion of the active matrix substrate side.

Due to the above-mentioned respective constitutions, the spacer can be used also as a member for absorbing an undesired interference electric field and, hence, the provision of only a single layer of light shielding film is sufficient. Furthermore, the height of the spacer at the color filter substrate (one substrate) side is arbitrarily adjustable and, hence, the control of an absorption amount of electric field is facilitated. Still furthermore, since the scattering of spherical spacers which has been necessary conventionally is no longer necessary, no problem of leakage of light occurs.

In contrast to the scattering of the conventional spherical spacers, the spacers of the present invention can be formed at given positions except for the pixel region and, hence, the control of the cell gap is facilitated. Furthermore, by making top faces of the protrusions formed on respective substrates have a planar structure, the contact areas of opposing substrates can be increased and, hence, the pressure applied to the spacers can be dispersed, thus enhancing the uniformity of the cell gap. Still furthermore, the spacer has a two-layered structure and, hence, the height of the respective protrusions can be restricted to less than the height of the cell gap, thus facilitating the rubbing of the orientation film and reducing the irregularities of the orientation around the periphery of the spacer.

Although the member for absorbing an undesired electric field may be a conductive body, such as metal, in such a case, the conductive body is arranged only at the facing portion of the pixel electrode (video signal electrode) and a light shielding film having a large insulation ability is coated on the conductive body such that the film covers the conductive body. Here, the conductive body is constituted to have the same potential as the counter electrode and, hence, the electric field shielding effect is further enhanced.

Furthermore, as the insulating light shielding film, an organic polymer material into which conductive particles made of metal, carbon or the like are mixed is used and the specific resistance can be regulated by adjusting the amount of the conductive particles used in the mixture.

The liquid crystal display device comprises a liquid crystal panel which includes a pair of substrates, with at least one of them being transparent, at least two kinds of color filters of different colors for color display and a black matrix interposed between the respective color filters, which are formed on one of a pair of the transparent substrates, a group of electrodes formed on a pair of the transparent substrates, a layer made of a liquid crystal composition disposed between a pair of the substrates and having a desired dielectric anisotropy, an orientation control layer for causing the molecular arrangement of the layer of this liquid crystal composition to be arranged in a given direction, and drive means which applies drive voltages to a group of the electrodes, and columnar spacers containing particles having substantially the same size as a desired. thickness of the liquid crystal layer are formed on at least one of a pair of the substrates. Due to such a constitution, a liquid crystal display device which can make the so-called cell gap and the luminance in the display screen uniform can be obtained.

The liquid crystal display device comprises a liquid crystal panel which includes a pair of substrates, with at least one of them being transparent, at least two kinds of color filters of different colors for color display and a black matrix interposed between the respective color filters, which are formed on one of a pair of the substrates, a group of electrodes, which includes signal wirings and common wirings formed on the other of a pair of the transparent substrates, a layer made of a liquid crystal composition disposed between a pair of the substrates and having a desired dielectric anisotropy, an orientation control layer for causing the molecular arrangement of the layer of this liquid crystal composition to be arranged in a given direction, polarizing plates which are laminated while having their respective polarizing axes disposed perpendicular to a pair of the gubstrates, and drive means which applies drive voltages to the group of electrodes, wherein the liquid crystal display device includes an electrode arrangement structure where a group of the electrodes apply voltages mainly in parallel with an interface between the orientation control layer and the layer of liquid crystal composition, and columnar spacers containing particles having substantially the same size as a desired thickness of the liquid crystal layer are provided on at least one of the pair of substrates, and the dielectric characteristics and the conductivity characteristics of the columnar spacers containing the above-mentioned particles are set to be higher than those of the liquid crystal composition, and the columnar spacers are formed on a portion between the signal wiring and the common wiring disposed at a position hidden by the black matrix.

Due to such a constitution, the mechanical strength of, the columnar spacer is enhanced and the disturbance of the electric field due to the provision of the columnar spacers can be prevented and, hence, a transverse electric field liquid crystal display device which exhibits the high contrast and the high luminance and is free from crosstalk can be obtained. Accordingly, a transverse electric field liquid crystal display device which prevents a lowering of the aperture rate, exhibits a high contrast and a high luminance with a black matrix of relatively low optical density, and is free from crosstalk can be obtained.

The particles contained in the columnar spacers are made of conductive beads. Since the particles contained in the columnar spacers are made of conductive material, the electric characteristics of the columnar spacers can be easily changed by arbitrarily setting the resistance value and the dielectric constant of the particles, as well as the material of the columnar spacers, and, hence, spacers having a smaller resistance and a higher dielectric constant than the liquid crystal can be formed so as to concentrate the noise electric field to the spacers, thus reducing the influence of the domain.

The columnar spacers are made of the same material as a protection film formed on an upper layer of the color filter formed on one substrate. A protective film which is made of organic material containing conductive spacers is formed on the other substrate. Due to such a constitution, the columnar spacers and the protective film can be simultaneously formed and, hence, the spacers can be manufactured easily.

DESCRIPTION OF THE PREFERRED EMBODIMENTS

The embodiments of the present invention will be explained in detail in conjunction with the accompanying drawings.

Figure 1:
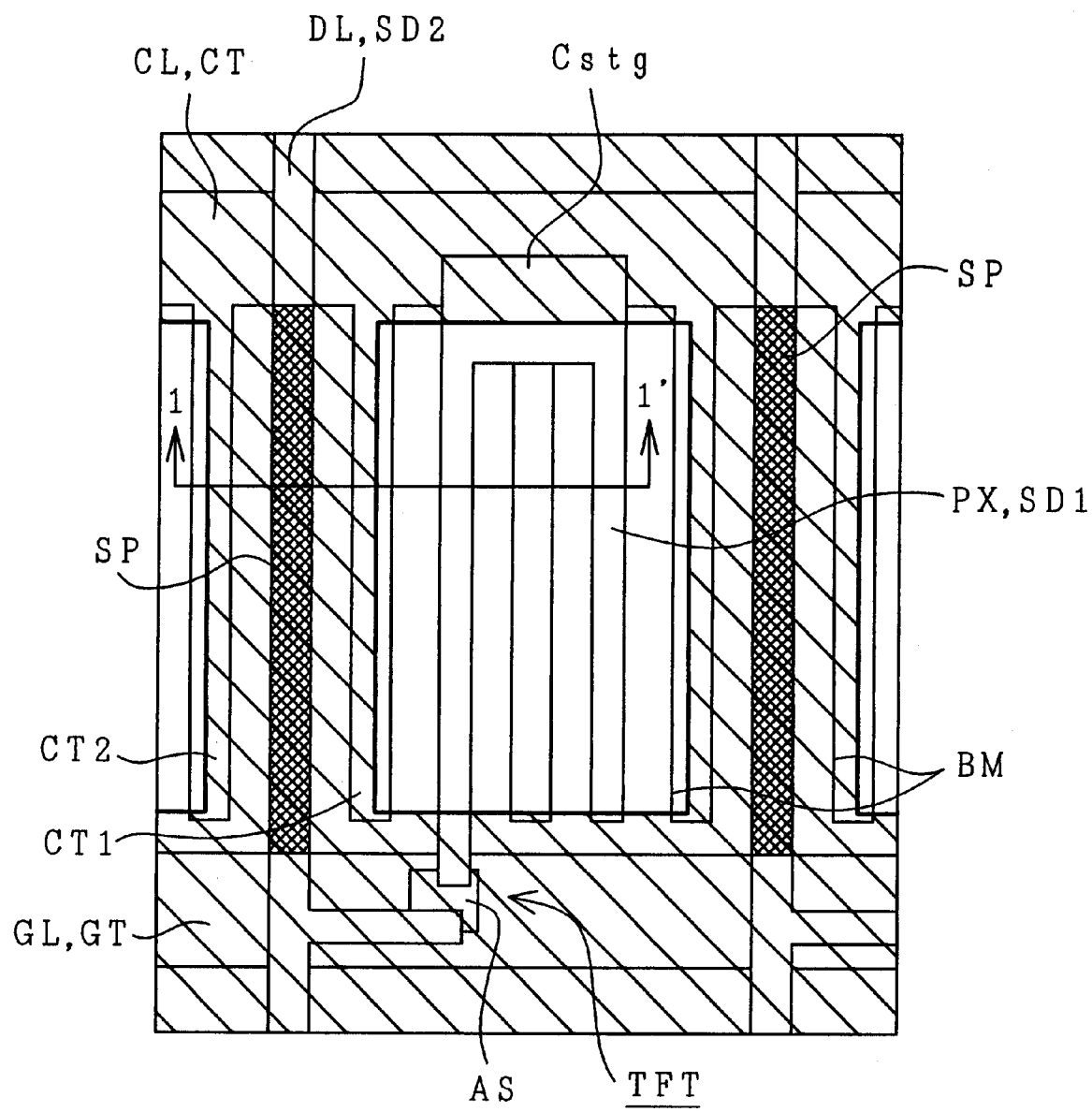
FIG. 1 is a plan view of a liquid crystal panel, in the vicinity of one pixel, representing a first embodiment of a liquid crystal display device of the present invention.
Figure 2:
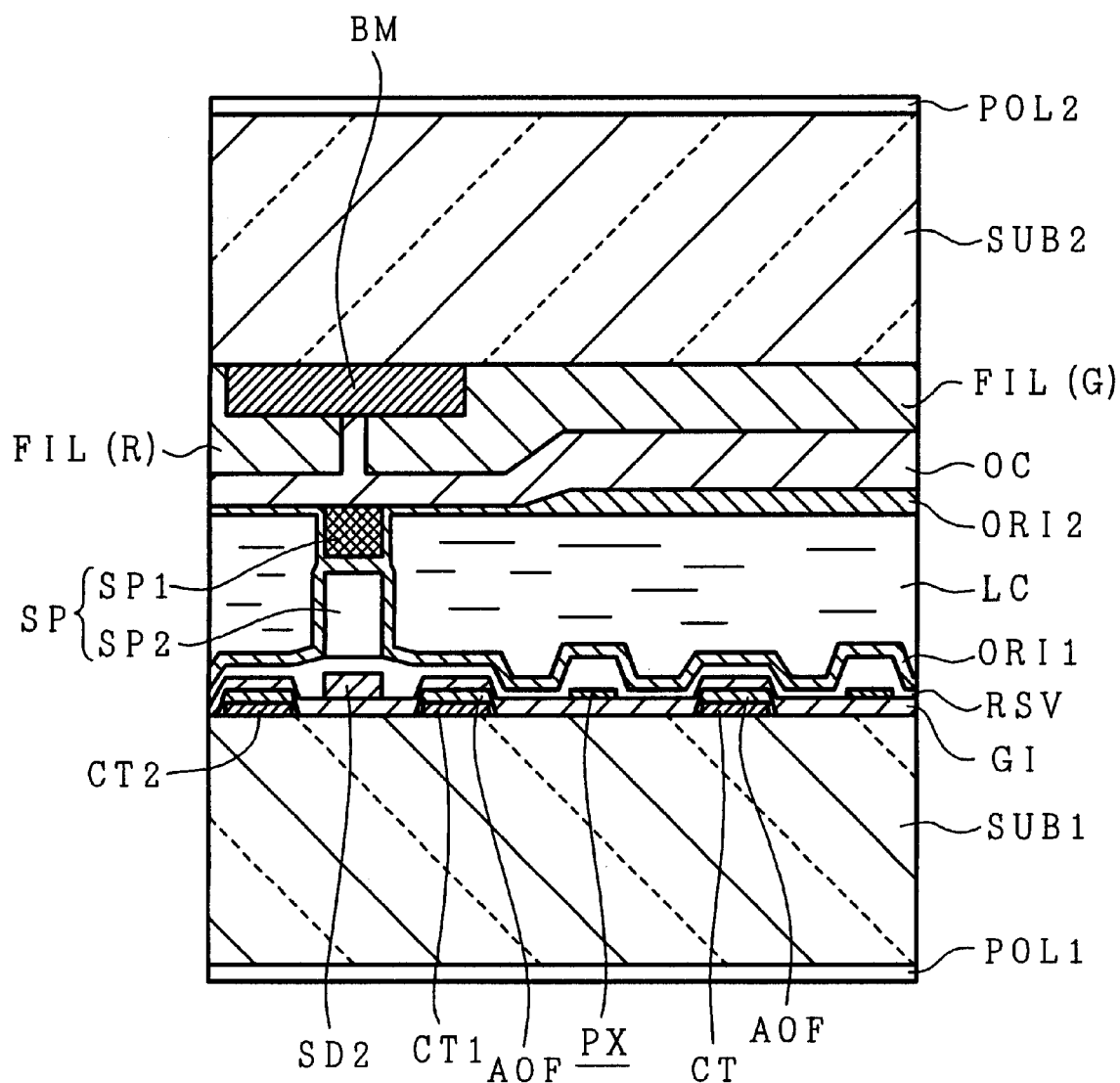
FIG. 2 is a cross sectional view taken along a line 1–1' of FIG. 1.

FIG. 1 is a plan view of a liquid crystal panel, in the vicinity of one pixel, representing a first embodiment of the liquid crystal display device of the present invention, and FIG. 2 is a cross sectional view of FIG. 1 taken along a line 1–1'. In these drawings, AS denotes an amorphous silicon (a-silicon), TFT denotes a thin film transistor, Cstg denotes a storage capacitance, CL denotes a counter voltage signal line, CT, CT1, CT2 denote counter electrodes, GL denotes a scanning signal line, GT denotes a gate electrode, PX denotes a pixel electrode, SD1 denotes a source electrode, SD2 denotes a drain electrode, and SP denotes a spacer.

The spacer SP of this embodiment is disposed in substantially the whole region right above a video signal line DL (the drain electrode SD2) and is in the form of a partition which is constituted by making the top faces of a protrusion SP1 of an electrode substrate (active matrix substrate) side and a protrusion SP2 of a counter substrate (color filter substrate) side come into contact with each other. The protrusion SP1 of the color filter substrate side is made of conductive material, while the protrusion SP2 of the active matrix substrate side is made of material similar to that of an insulation film PSV.

Accordingly, an electric field (undesired electric field) generated between the pixel electrode PX and a common electrode CT2 can be attenuated by the drain electrode SD2. Furthermore, since such an electric field is absorbed by the protrusion SP1 of the color filter substrate side, no crosstalk occurs. Still furthermore, the thickness of the liquid crystal LC can be controlled by the spacers SP and, hence, it is no longer necessary to use conventional spherical spacers (plastic beads) so that the lowering of the contrast caused by the leakage of light from the periphery of the spacer and the poor display caused by the uneven distribution of the spacers, which are liable to occur in case the conventional spherical spacers are used, will no longer occur.

As a criteria of the conductivity of the protrusion SP1 of the counter substrate side, the specific resistance is set to less than $10^8$ $\Omega$·cm so that the smear, which is a crosstalk phenomenon, can be attenuated.

In the transverse electric field system, the electrodes are substantially formed on only the substrate side on which active elements are mounted. Since the electric field is applied nearly in parallel with the substrate, a conductive body on the counter substrate hinders the formation of the electric field for selecting a pixel. Accordingly, in case a black matrix BM is provided on the counter substrate side, it is inevitable that the material thereof will not be metal, but will be an insulating material which does not affect the applied voltage. The inventors have found that by setting the specific resistance of the protrusion SP1 of the counter substrate side to less than $10^8$ $\Omega$·cm, the shielding effect against the undesired electric field of the common electrode CT2 adjacent to the video signal electrode SD2 can be reinforced. This finding is based on the result of experiments which show that the protrusion SP1, which is made of an insulating body having a Specific resistance of less than, $10^8$ $\Omega$·cm, absorbs the electric field even though it is made of the insulating material.

Figure 3A:
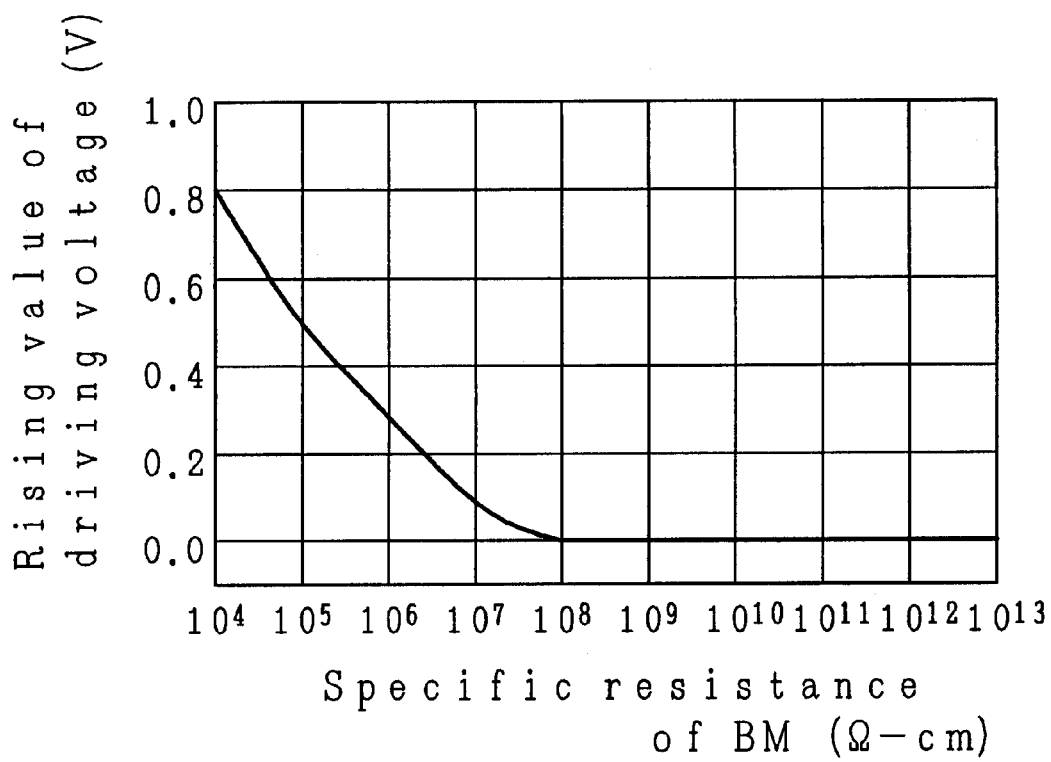
FIG. 3A is a graph showing the result of an experiment on the relationship between the specific resistance and the drive voltage of the black matrix according to the first embodiment of the present invention.
Figure 3B:
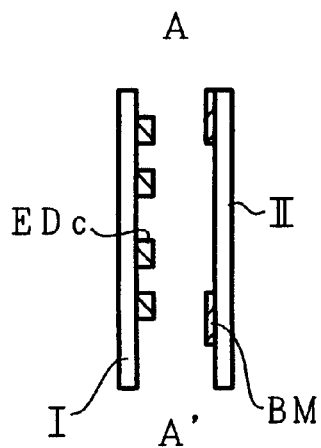
FIG. 3B(b-1) is a plan view and FIG. 3B(b-2) is a sectional view taken along line A–A' in FIG. 3B(b-1) showing the constitution of a liquid crystal cell used in this experiment.
Figure 3B:
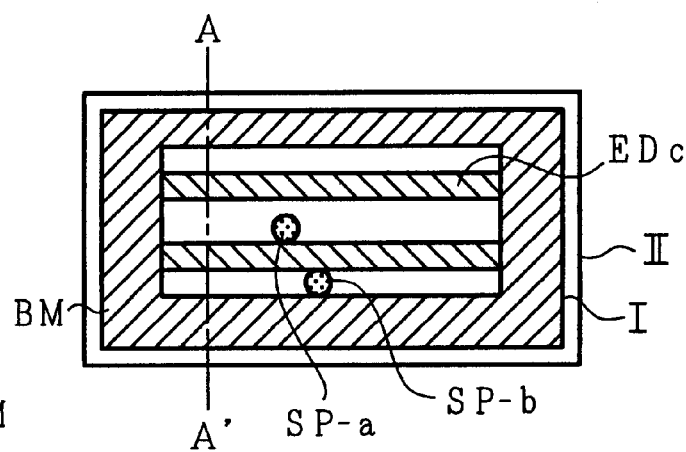

FIG. 3A is a graph showing the result of an experiment on the relationship between the specific resistance and the drive voltage of the black matrix in t he first embodiment of the present invention and the constitution of a liquid crystal cell used in the experiment; and FIG. 3B(b-1) is a plan view of the electrode substrate and FIG. 3B(b-2) is a cross sectional view of FIG. 3B(b-T) taken along a line A–A'.

In this experiment, as shown in FIG. 3B(b-1), the test sample was constituted such that a counter substrate (corresponding to the color filter substrate) II on which the black matrix BM is formed is overlapped on an electrode substrate (corresponding to the active matrix substrate) I on which a comb-teeth like electrode Edc is formed and a liquid crystal is filled in a gap defined between them. Using this test sample, the drive voltage at SP-a spot a which is not affected by the black matrix BM and the drive voltage at a spot SP-b which may be affected by the black matrix BM were measured and these drive voltages were compared. As a result of the experiment, it is found that the drive voltage is elevated in case the, specific resistance of the material of the black matrix BM is less than $10^8$ $\Omega$·cm. That is, it has been proven that even when the black matrix BM is made of an insulating body, it absorbs the electric field in case the specific resistance thereof is less than $10^8$ $\Omega$·cm. Accordingly, by using an insulating body having the specific resistance of less than $10^8$ $\Omega$·cm as the material of the black matrix BM, the effect that the undesired electric field can be shielded is obtained.

Furthermore, by setting the specific resistance of the protrusion SP2 on the electrode substrate shown in FIG. 2 to not less than $10^8$ $\Omega$·cm and moving the protrusion SP2 away from the drain electrode SD2 to some extent, it becomes possible. to prevent the protrusion SP2 from affecting the electric field for display generated between the pixel electrode PX and the common electrode CT1.

The specific resistance of the insulating body can be controlled by a method which disperses metal particles or carbons in a polymer organic material, wherein by adjusting the content of these ingredients, the specific resistance of the insulating body can be regulated.

Figure 4:
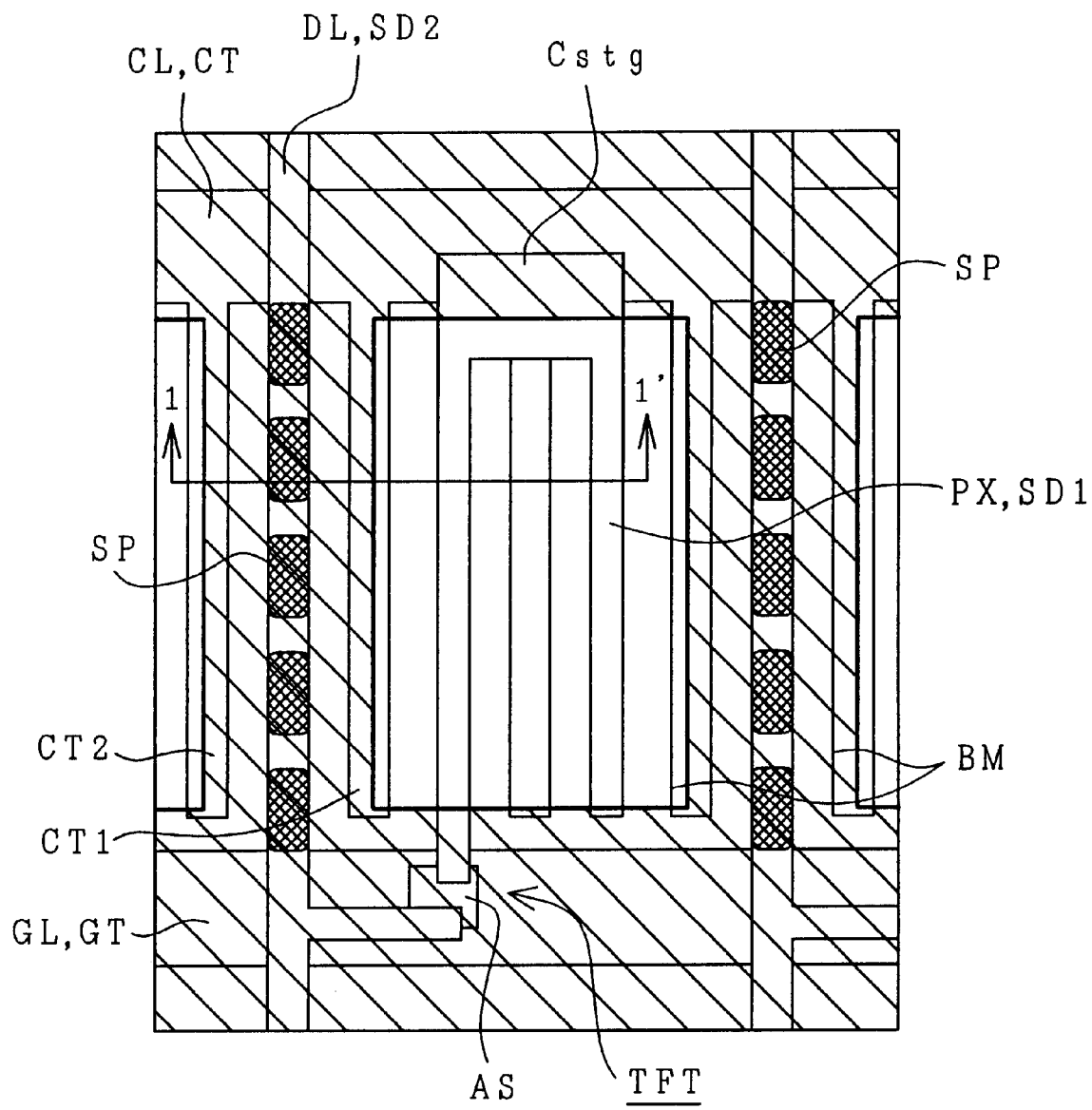
FIG. 4 is a plan view of a liquid crystal panel, in the vicinity of one pixel, representing a second embodiment of a liquid crystal display device of the present invention.

FIG. 4 is a plan view of a liquid crystal display, in the vicinity of one pixel, representing a second embodiment of the liquid crystal display device of the present invention. The cross sectional view of FIG. 4 taken along a line 1–1' is similar to that of FIG. 2.

Although the spacer SP is formed in a partition form which is disposed right above the video signal line and right below the black matrix BM in the abovementioned first embodiment, this second embodiment differs from the first embodiment in that a plurality of columnar spacers SP are arranged in place of a single partition, although the arranged position of the spacers SP is as same as that of the first embodiment.

These spacers are constituted in the same manner as the spacer shown in FIG. 2, that is, they are constituted by protrusions SP2 formed on the active matrix substrate side and protrusions SP1 formed on the color filter substrate side. According to this embodiment, in addition to the effects obtained with the first embodiment, an effect is obtained in that the liquid crystal flows between respective columnar spacers SP at the time of filling the liquid crystal in the gap defined between opposing faces of the active matrix substrate and the color filter substrate and, hence, liquid crystal filling operation can be facilitated.

Figure 5:
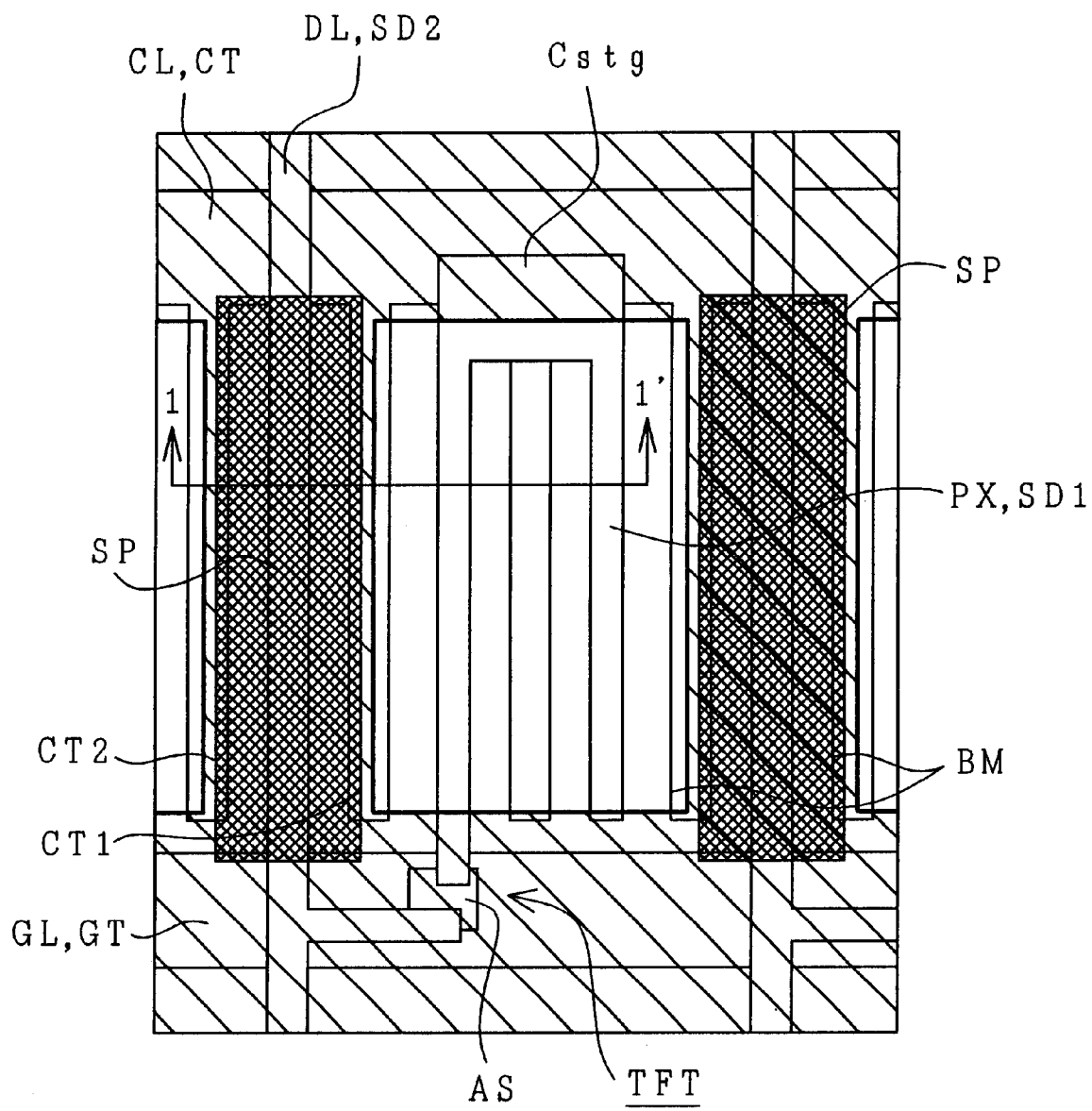
FIG. 5 is a plan view of a liquid crystal panel, in the vicinity of one pixel, representing a third embodiment of a liquid crystal display device of the present invention.
Figure 6:
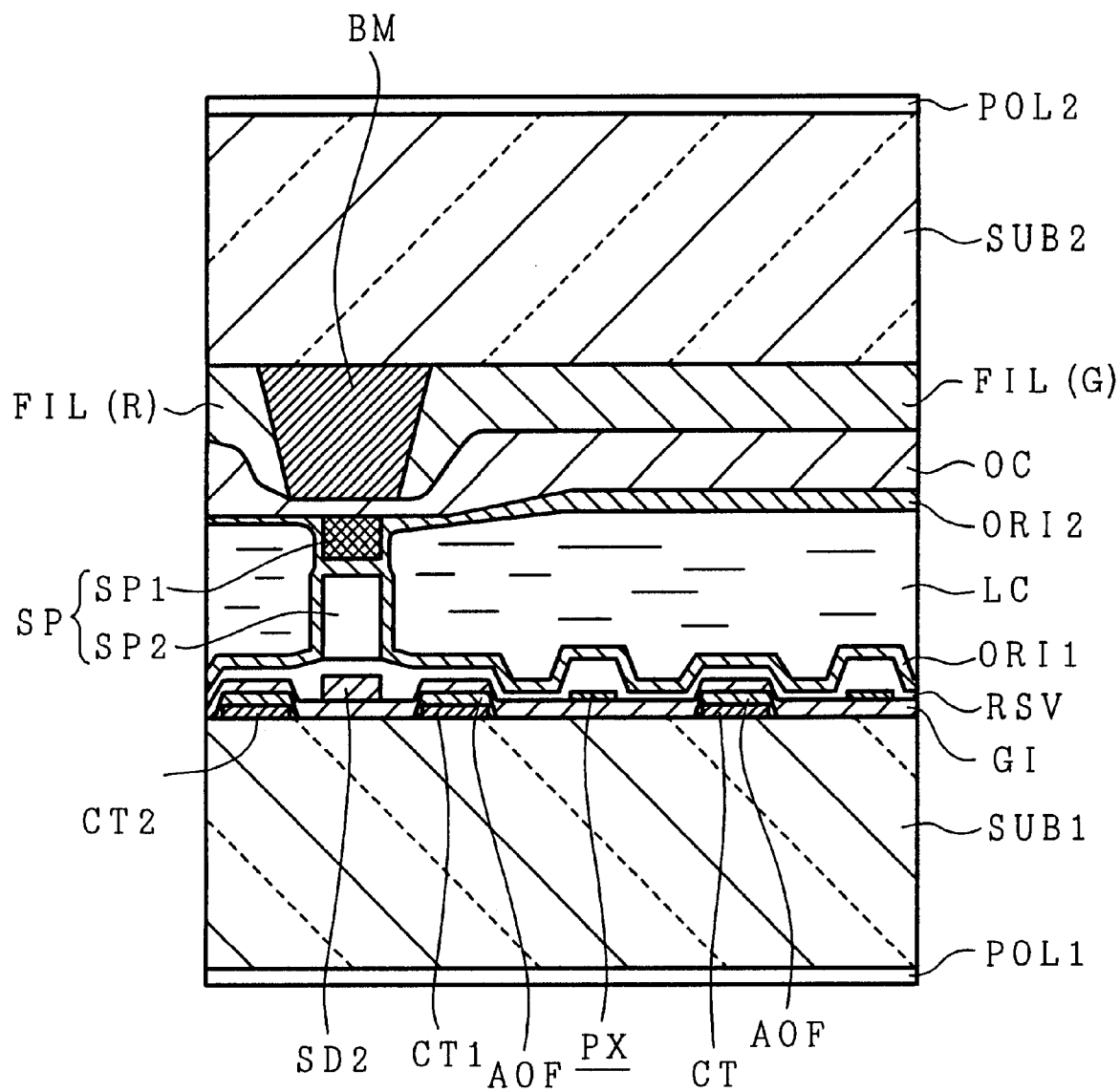
FIG. 6 is a cross sectional view taken along a line 1–1' of FIG. 5.

FIG. 5 is a plan view of a liquid crystal panel, in the vicinity of one pixel, representing a third embodiment of the liquid crystal display device of the present invention, and FIG. 6 is a cross sectional view of FIG. 5 taken along a line 1–1'.

In the first and second embodiments, the spacers SP are formed in a partition or columns which are arranged right above the video signal line and right below the black matrix BM. With respect to the spacer SP of this embodiment, although the protrusion SP2 of the active matrix substrate side has a similar constitution as that of the first embodiment shown in FIG. 1 and FIG. 2, this embodiment differs from the first and second embodiments in that the protrusion SP1 formed on the color filter substrate side is constituted such that the height of the black matrix BM at the pixel side is increased, and the protrusion PS1, which is made of material having a specific resistance of less than $10^8$ Ω·cm, is formed in the top face of the black matrix BM.

According to this embodiment, in addition to the similar effect as that of the first embodiment, the thickness and the width of the protrusion SP1 can be arbitrarily set such that the protrusion SD1 carries out an optimal absorption of the electric field in response to the magnitude of the crosstalk.

Figure 7:
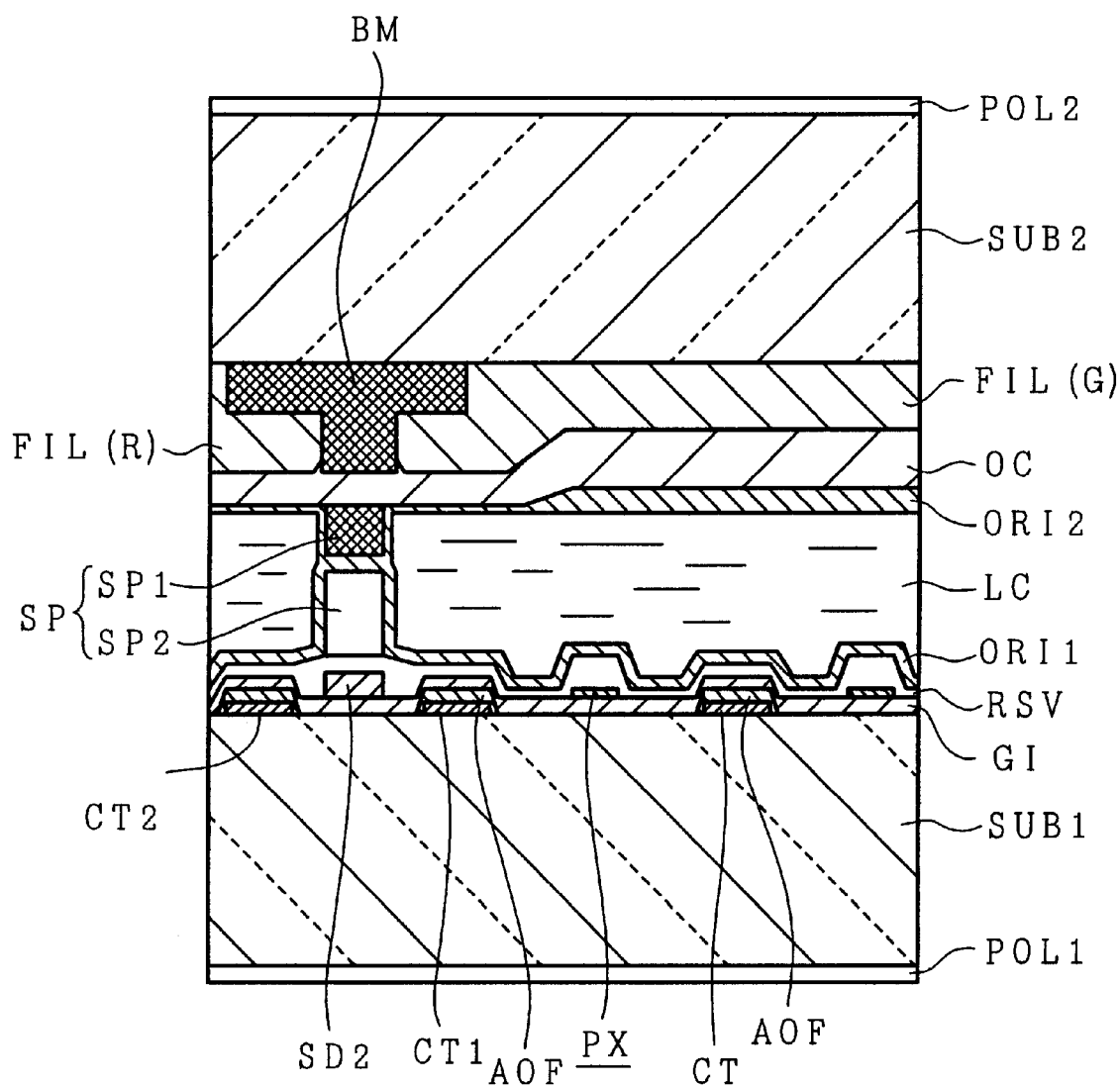
FIG. 7 is a plan view of a liquid crystal panel, in the vicinity of one pixel, representing a fourth embodiment of a liquid crystal display device of the present invention.

FIG. 7 is a plan view of a liquid crystal panel, in the vicinity of one pixel, representing a fourth embodiment of the liquid crystal display device of the present invention. While the thickness of the black matrix BM is increased as a whole in the third embodiment, the height of only the central portion of the black matrix BM, that is, the portion of the black matrix BM which corresponds to the drain electrode SD2 is increased in this embodiment. According to this embodiment, similar effects as those of the first embodiment are obtained.

The height of the black matrix BM in the third and fourth embodiments can be formed in the discontinuity to form the columnar spacers similar to those shown in FIG. 2. Due to such a constitution, a similar effect as that of the second embodiment is obtained.

One example of the manner of manufacturing the liquid crystal display device of the present invention will be explained hereinafter based on the liquid crystal display device of the first embodiment.

Figure 8:
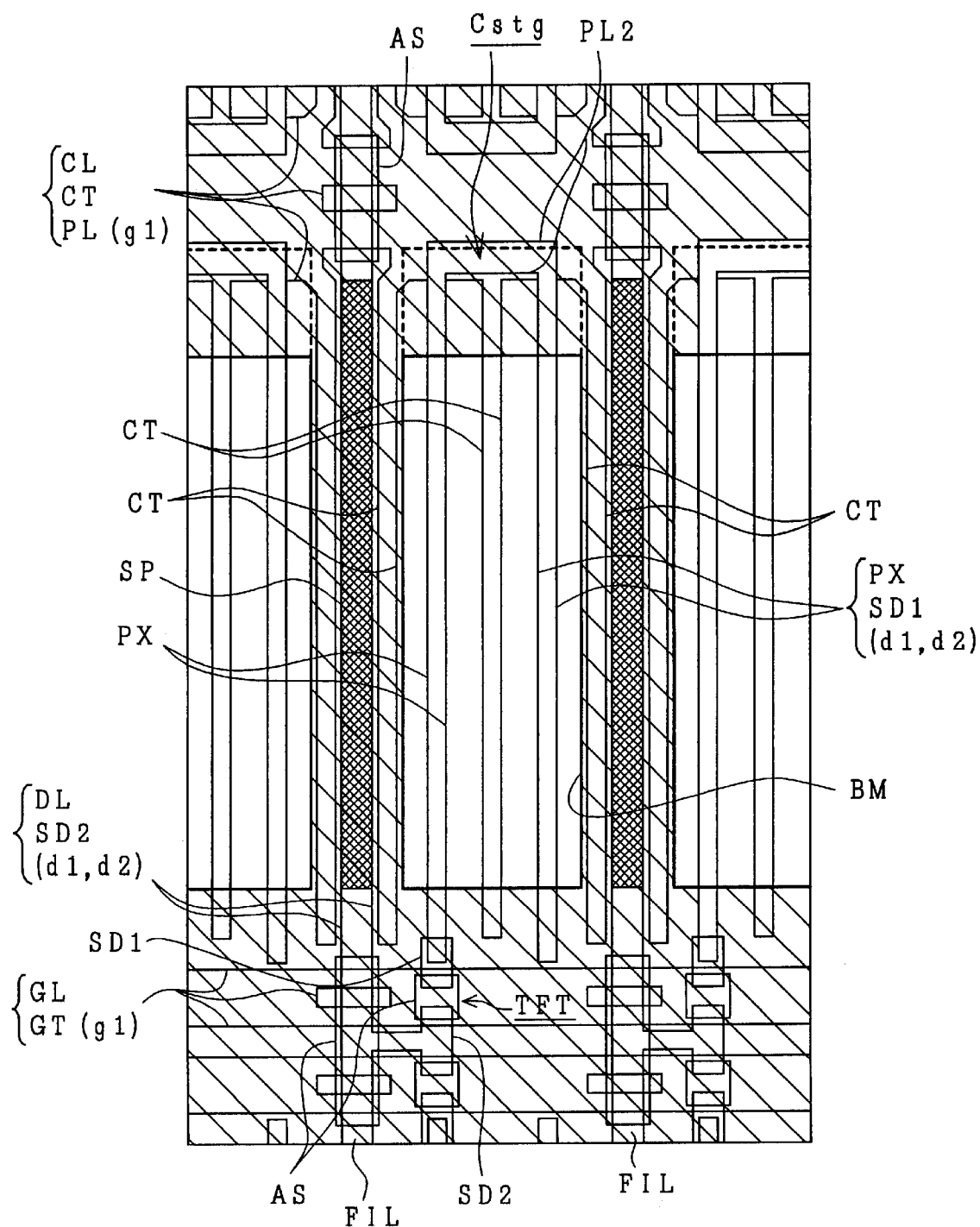
FIG. 8 is a plan view of a liquid crystal panel, in the vicinity of one pixel, incorporating the first embodiment of the liquid crystal display device of the present invention.

FIG. 8 is a plan view of the constitution of the liquid crystal panel, in the vicinity of one pixel, in which the first embodiment is incorporated and constitutes the liquid crystal display device of the present invention.

First of all, as in the process for forming the typical thin film transistor, the thin film transistor TFT made of amorphous silicon AS, the storage capacity Cstg, a group of electrodes including the comb-teeth like pixel electrode Px, the source electrode SD1 and the counter electrode CT and the like are, formed on the glass substrate having a thickness of 0.7 mm or 1.1 mm by repeating film forming and patterning processes.

The video signal line DL for applying a given voltage to the above-mentioned group of electrodes by way of the thin film transistor TFT, the drain electrode SD2, the counter voltage line CL and a plurality of scanning signal lines GL and gate electrodes GT for controlling the conduction of the thin film transistor TFT are formed in a matrix. The thin film transistor TFT, a group of various electrodes and various wirings are coated with the insulation film GI (see FIG. 2) and the protective film PSV.

Subsequently, a transparent ultraviolet-curable resin resist is coated on the entire surface and ultraviolet rays are irradiated by way of a photomask having a given aperture pattern at a position where the spacer P is to be formed and the resist is developed, and is post-baked so as to form the protrusion SP2. Since the lower side of the protrusion SP2 is substantially flat, the bottom portion and the top portion of the protrusion SP2 have substantially the same area. In the ultraviolet ray irradiation step, since the film thickness of the ultraviolet-curable resin resist is thick, only the surface of the resist is cured. Here, it is important that the uncured portion is sufficiently cured by the ensuing post-baking so as to make the protrusion SP2 insoluble to the liquid crystal. Then, orientation film material such as polyimide is coated, is baked and is subjected to rubbing treatment so as to form the orientation film (referred to orientation control layer) ORI1, thus obtaining the active matrix substrate.

Subsequently, a photosensitive black resin resist is coated on a glass substrate having a thickness of 0.7 mm or 1.1 mm and is exposed by way of a photomask having a given aperture pattern and is developed. After being developed, the resist is baked so as to form the black matrix BM having an aperture at each pixel portion. On this black matrix BM, a photosensitive first color, for example, a red resin resist is coated and is exposed by way of a photomask having the red filter; aperture pattern and the resin is developed and baked so as to form the red filter FIL(R). Thereafter, in the same manner, using a second color such as a green resin resist and a third color such as a blue resin resist, the green filter FIL(G) and the blue filter FIL(B) are respectively formed.

On the upper layer of the color filter films formed in the above manner, the overcoat film OC is coated. This overcoat film OC is provided for chemically separating the color filters and the black matrix from the liquid crystal LC and for smoothing the surface of the color filter film.

On the entire surface of the overcoat film OC an ultraviolet-curable resin resist having a specific resistance of less than $10^8$ Ω·cm after curing is coated. The resin is exposed by way of a photomask having a given aperture at a position where the spacer is to be formed, is developed and is post-baked so as to form the protrusion SP1. The bottom portion and the top portion of this protrusion SP1 also have substantially the same area. In the same manner as the protrusion SP2, it is important that the protrusion SP1 is sufficiently cured by the post-baking so as to make the protrusion SP1 insoluble to the liquid crystal. Then, orientation film material is coated, is baked and is subjected to rubbing treatment so as to form the orientation film OR2, thus obtaining the color filter substrate.

By laminating the active matrix substrate and the color filter substrate which are manufactured in the above manner, the top faces of the protrusion SP2 of the active matrix substrate side and the protrusion SP1 of the color filter substrate side are brought into contact with each other and, hence, the spacer SP which bridges the gap defined between the active matrix substrate and the color filter substrate can be formed. Ensuing steps for adhering both substrates and filling the liquid crystal are the same as those steps of a known method for fabricating liquid crystal display devices.

The spacer SP of the first embodiment manufactured in this method is formed in a partition form along both sides of the pixel region right below the black matrix BM and right above the drain electrode SD2. By directing the extending direction of this spacer SP toward a liquid crystal inlet, the normal filling speed of the liquid crystal is obtained.

The spacer SP of the second embodiment is obtained by changing the aperture pattern of the photo mask for exposing the ultraviolet-curable resin resist coated on the overcoat film OC in the above-mentioned manufacturing method.

The spacer SP of the third embodiment or the fourth embodiment is obtained by making the thickness of the coated film of the black matrix material thicker in the step for forming the black matrix BM or carrying out the step for forming the black matrix BM twice. Furthermore, in the first and second embodiments, although the black matrix BM is formed before forming the color filters, a method which forms the color filters first and then forms the black matrix may be adopted.

Now the present invention will be explained more specifically with reference to the first embodiment.

In the liquid crystal panel manufactured by the above-mentioned method, the optical density (OD value) of the black matrix BM of the counter substrate (color filter substrate) is set to 1.8, the film thickness of the protrusion SP1 of the counter substrate side is set to 1 µm, and the width of the protrusion SP1 is set to 6 µm which is equal to the width of the video signal line DL and the drain electrode SD2. The film thickness of the protrusion SP2 of the electrode substrate (active matrix substrate) side is set to 3 µm and the width of the protrusion SP2 is set to 6 µm as in the case of the protrusion SP1. Accordingly, the cell gap becomes 4 µm.

Using this liquid crystal panel, an active matrix liquid crystal display device is provided which employs an alternating current voltage as the voltage applied to the counter electrode. This liquid crystal display device has a wide viewing angle of 60 degrees in up and down directions as well as in left and right directions, without tone inversion, and smear, which is a crosstalk generated along the liquid crystal signal electrode, is not observed at all.

Various comparison examples or controls will be explained hereinafter for clarifying the effects of the present invention.

COMPARISON EXAMPLE 1

By scattering spherical spacers having an average particle size of 4.25 µm in place of the spacer of the present invention, a liquid panel having a cell gap of 4 µm as in the case of the first embodiment was constituted. When a liquid crystal display device which uses this liquid crystal panel was driven under the same conditions as described above, smear which is a crosstalk generated along the liquid crystal signal electrode occurred. Furthermore, at the time of black display, a leakage of light occurs from the spherical spacers present in the pixel portion and, hence, a deterioration of the image quality was recognized.

COMPARISON EXAMPLE 2

A liquid crystal panel was constituted in the same manner as the first embodiment. However, the specific resistance of the protrusion SP1 of the counter substrate side was set to $10^4$ Ω·cm and the film thickness was set to 4 µm, and the film width was set to 6 µm in the same manner as the width of the electrode, and the spacer SP2 was not provided on the electrode substrate side.

When a liquid crystal display device using this liquid crystal panel was driven under the same conditions as, described above, the liquid crystal display device had a wide viewing angle of 60 degrees in up and down directions as well as in left and right directions without tone inversion, and smear which is a crosstalk generated along the liquid crystal signal electrode was not observed. However, the drive voltage rose and the speed of response became slow.

Therefore, according to the first to fourth embodiments of the present invention, in a liquid crystal panel of a transverse electric field liquid crystal display device, protrusions are respectively formed on the color filter substrate and the active matrix substrate and the spacer which bridges the gap defined between both substrates is formed by bringing the top faces of the respective protrusions into contact with each other, the specific resistance of the protrusion of the color filter substrate side is set to less than $10^8$ Ω·cm. Accordingly, a transverse electric field liquid crystal display device having a wide viewing angle without crosstalk is obtained. Furthermore, by setting the specific resistance of the protrusion of the active matrix substrate side to not less than $10^8$Ω·cm, a liquid crystal display device with less crosstalk is obtained.

Figure 9:
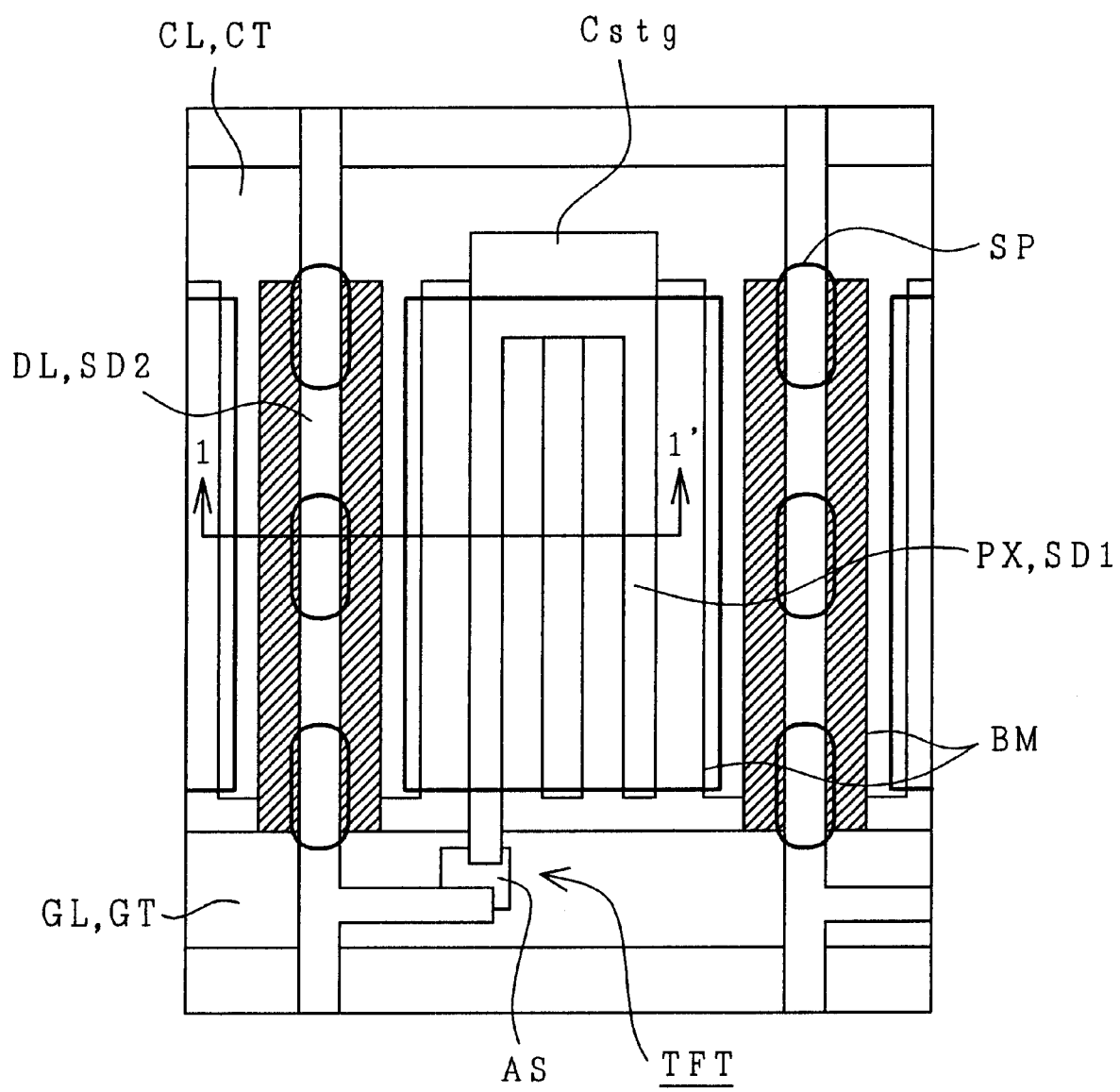
FIG. 9 is a plan view of a liquid crystal panel, in the vicinity of one pixel, which constitutes a transverse electric field Active matrix liquid crystal display device according to a fifth embodiment of the liquid crystal display device of the present invention.
Figure 10:
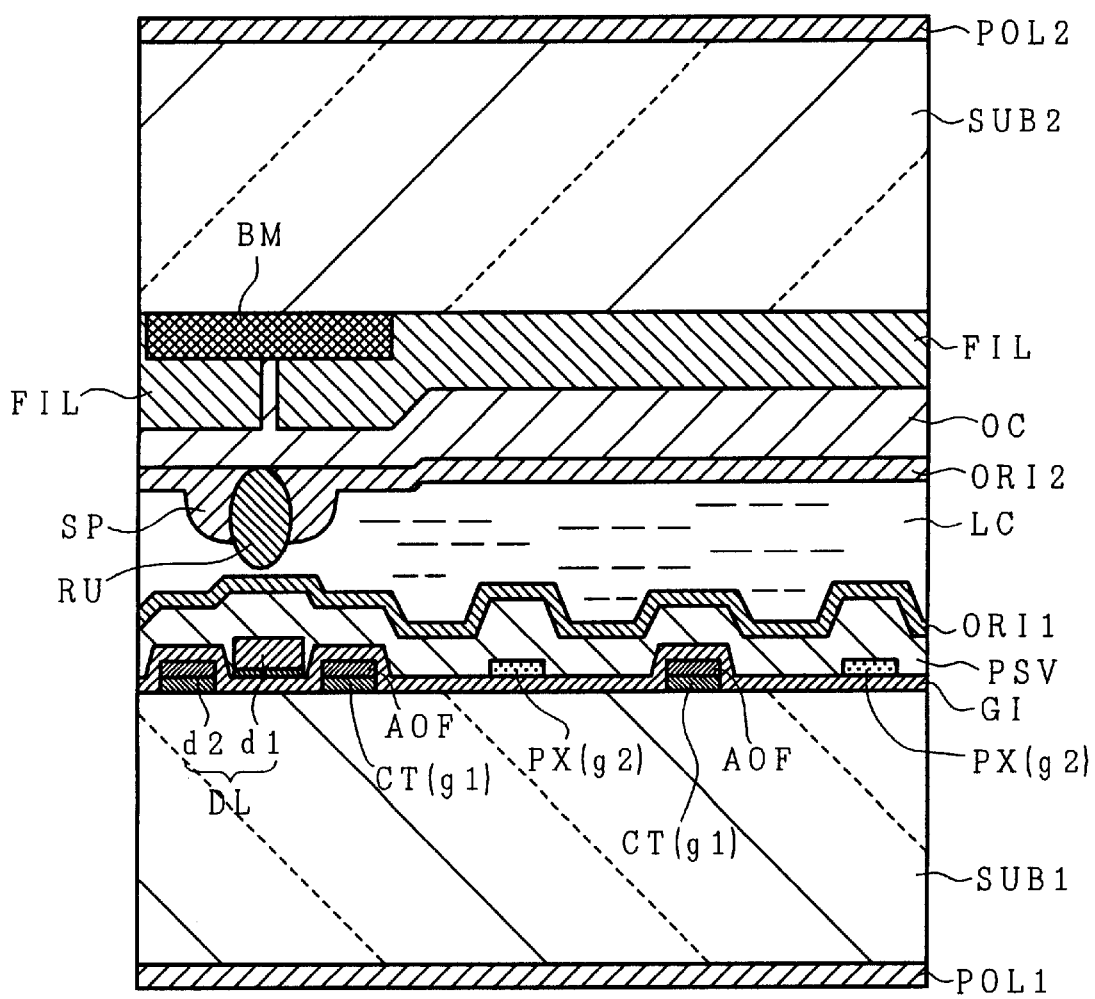
FIG. 10 is a cross sectional view taken along a line d1–1' of FIG. 9.
Figure 17:
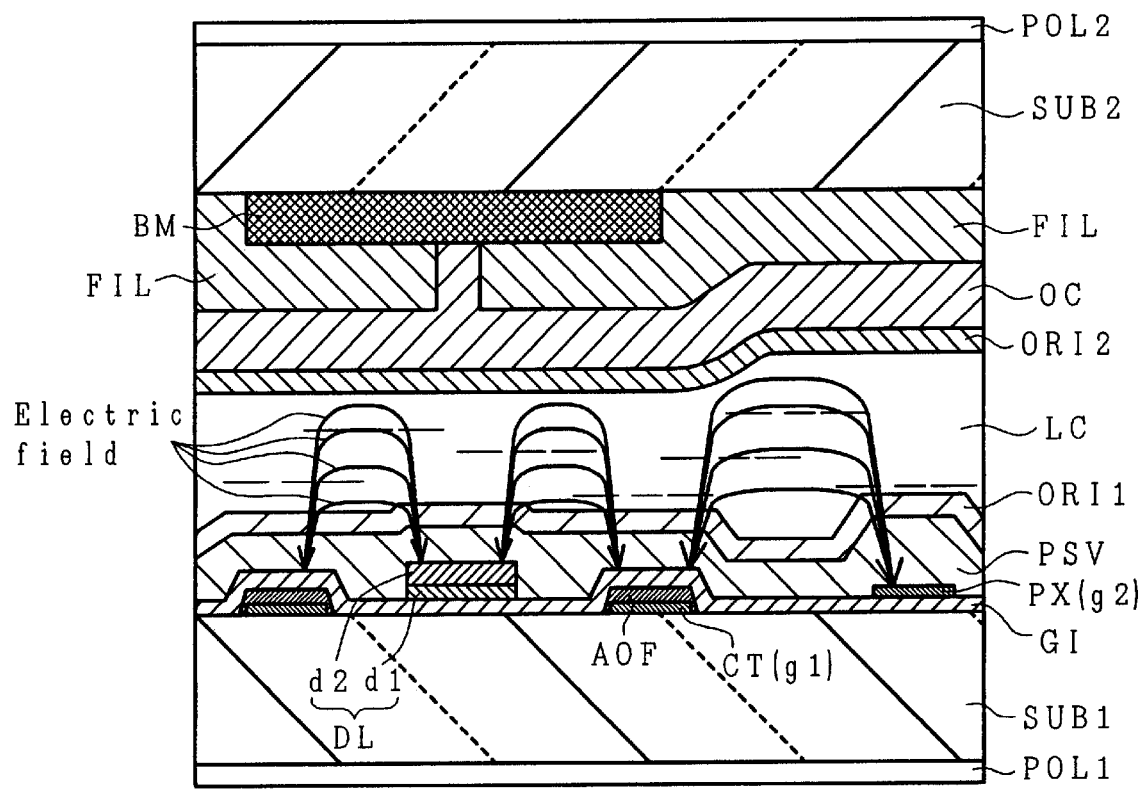
FIG. 17 is a cross sectional view showing the electric field generated by a transverse electric field liquid crystal display device.
Figure 18:
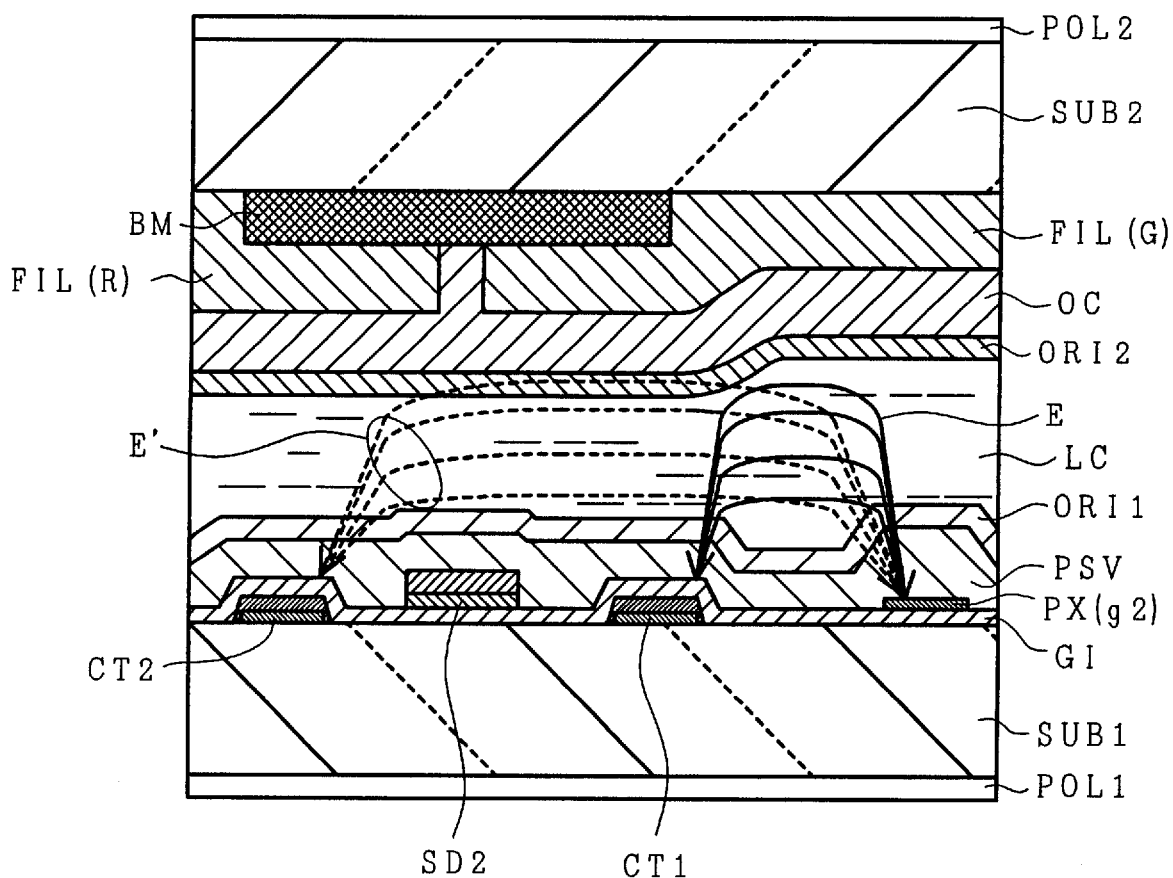
FIG. 18 is a cross sectional view showing an example of the arrangement of the electrodes which form one pixel of a liquid crystal panel constituting a conventional transverse electric field liquid crystal display device.

FIG. 9 show a fifth embodiment. FIG. 9 is a plan view of a liquid crystal panel in the vicinity of one pixel which constitutes a transverse electric field active matrix liquid crystal display device according to the first embodiment of the present invention. FIG. 10 is a cross sectional view of FIG. 9 taken along a line 1–1'. In FIG. 9 and FIG. 10, the same symbols which also appear in FIG. 17 denote portions having corresponding functions and various electrodes and various structural films arranged between a pair of substrates SUB1, SUB2 are substantially the same as those of FIG. 17, except for the columnar spacers SP and particles RU contained in the columnar spacers SP.

That is, in FIG. 9, DL denotes a video signal line, SD2 denotes a drain line extending from the video signal line DL, CL denotes a counter voltage signal line, CT denotes a counter electrode which is integral with the counter voltage signal line CL, PX denotes a pixel electrode, SD1 denotes a source electrode which is identical with the pixel electrode PX, Cstg denotes a storage capacitance, GL denotes a scanning signal line, GT denotes a gate electrode which is identical with a scanning electrode, BM denotes a black matrix (indicated by a border line of an aperture of the pixel), TFT denotes a thin film transistor, and SP denotes a columnar spacer. In FIG. 9, the hatching shows a region between the video signal line DL an d the counter electrode CT.

In FIG. 10, SUB1 denotes one substrate (active matrix substrate or TFT substrate), SUB2 denotes the other substrate (color filter substrate), GI denotes a gate insulation Film, PSV denotes a passivation layer (protective layer), ORI1 denotes an orientation film of one substrate side, LC denotes a liquid crystal layer, ORI2 denotes an orientation film of the other substrate side, OC denotes an overcoat layer, FIL denotes a color filter, and BM denotes a black matrix.

Furthermore, RU denote particles contained in the columnar spacer, DL (d1, d2) denotes a video signal line, CT (g1) denotes a counter electrode, PX (g2) denotes a pixel electrode, and AOF denotes an insulation layer made of aluminum oxide. In the parentheses, d1, d2, g1, g2 denote their wirings or conductive body layers which form the electrodes. POL1, POL2 which are installed at the outsides of a pair of substrates SUB1, SUB2, respectively, are polarizing plates.

The columnar spacer SP is formed of a resist which is also the material of the orientation film ORI2 and contains a particle RU which has substantially the same size as the cell gap at the inside thereof. Therefore, even if the height of the resist portion of the columnar spacer SP is smaller than the cell gap, a given cell gap can be formed by means of the particle RU inside of the columnar spacer. Accordingly, the cell gap becomes uniform so that the luminance inside of display screen becomes uniform.

In this embodiment, although the columnar spacer SP is formed on the color filter substrate (the other substrate SUB2), the columnar space SP may be formed on the active matrix substrate (one substrate SUB1) side.

Figure 11:
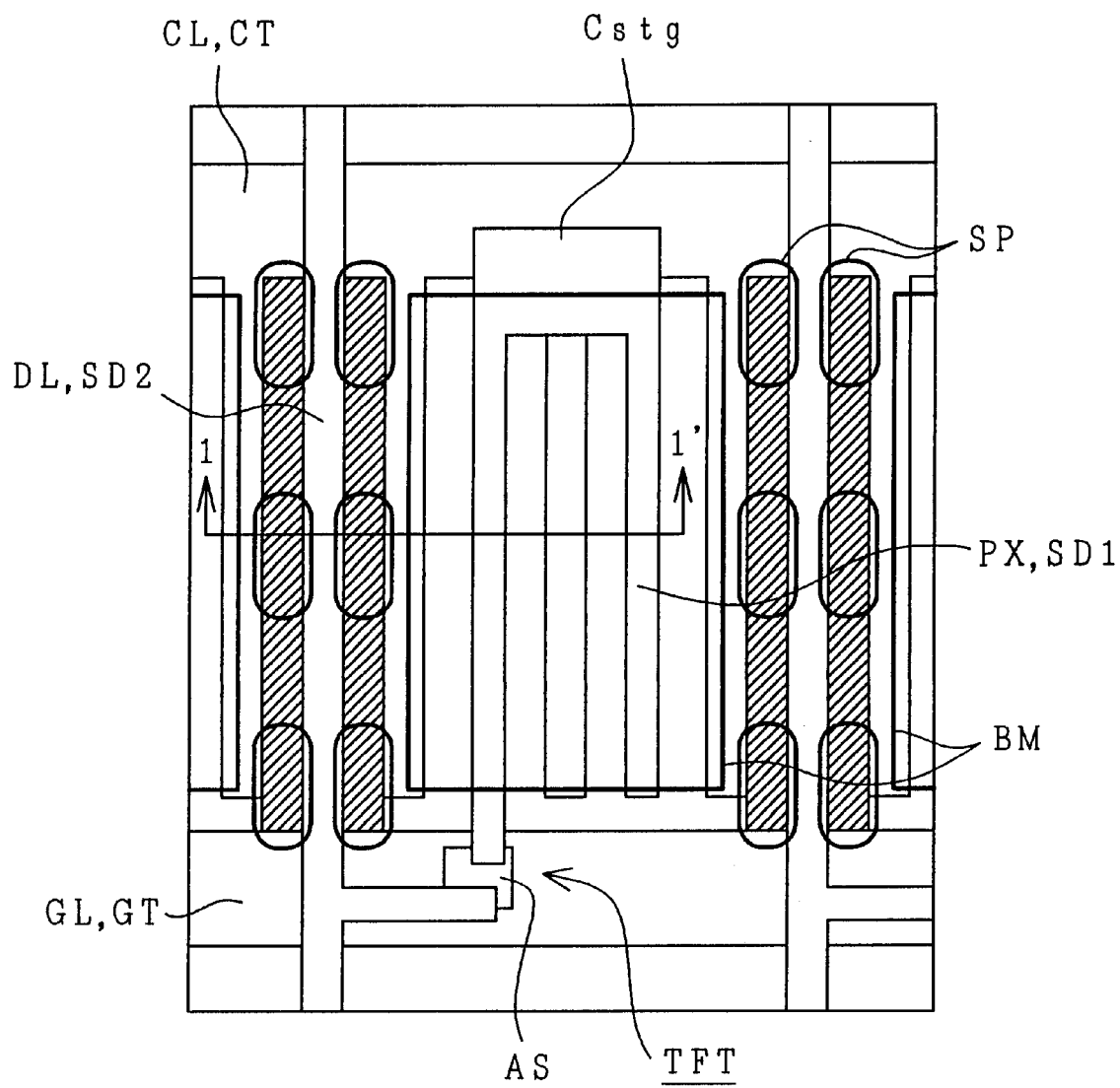
FIG. 11 is a plan view of a liquid crystal panel, in the vicinity of one pixel, which constitutes a transverse electric field system active matrix liquid crystal display device according to a sixth embodiment of the liquid crystal display device of the present invention.
Figure 12:
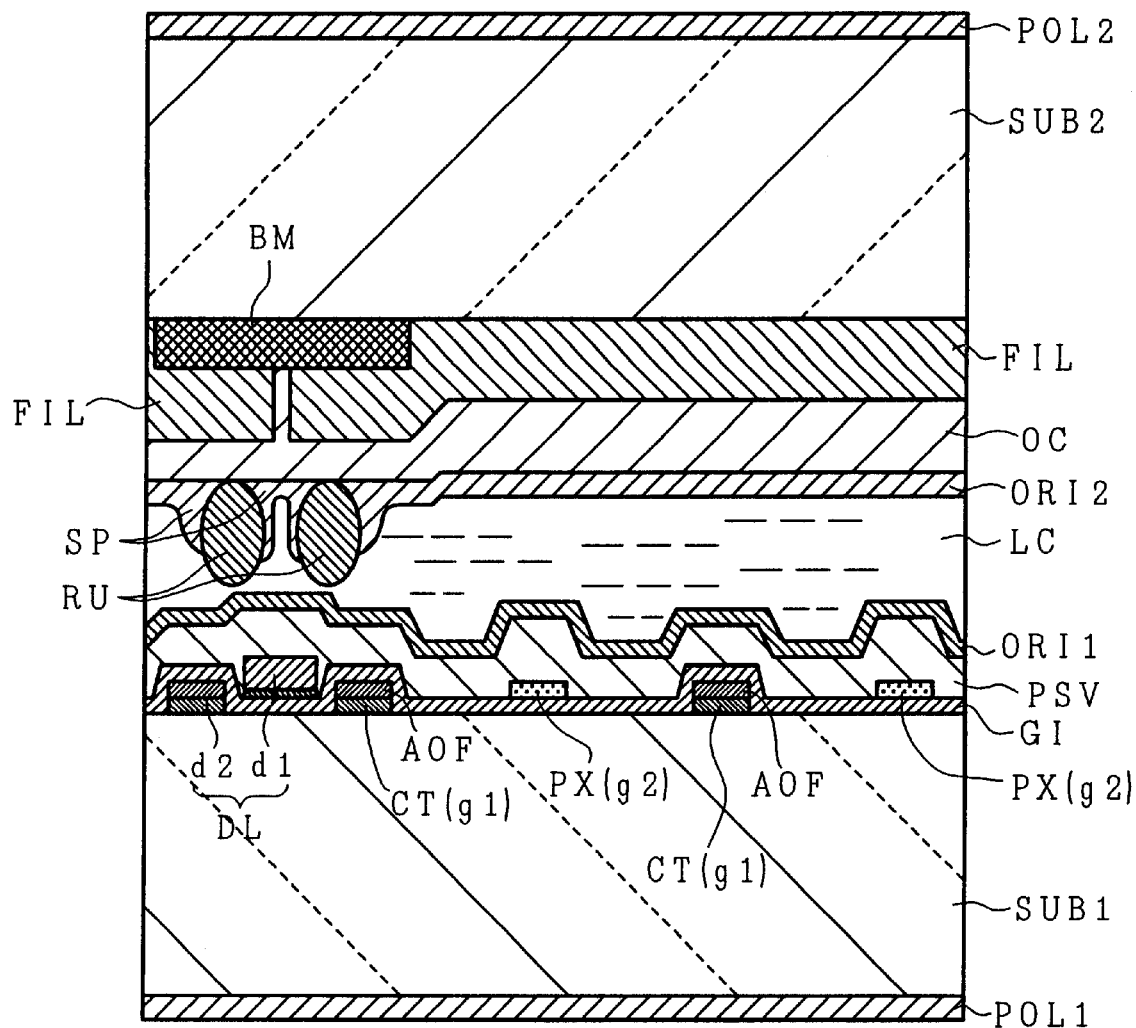
FIG. 12 is a cross sectional view taken along a line 1–1' of FIG. 11.

FIG. 11 is a plan view of a liquid crystal panel in the vicinity of one pixel which constitutes a transverse electric field active matrix liquid crystal display device according to a sixth embodiment of the present invention. FIG. 12 is a cross sectional view of FIG. 11 taken along a line 1–1'.

In FIG. 11 and FIG. 12, the same symbols which also appear in FIG. 9 and FIG. 10 denote portions having corresponding functions and various electrodes and various structural films arranged between a pair of substrates SUB1, SUB2 are substantially the same as those of the first embodiment, except for the shape and the arrangement of the columnar spacers SP.

As shown in FIG. 12, the columnar spacers SP are formed as a pair in the vicinity of a position right below the black matrix BM. The columnar spacers SP partially cover the region between the video signal line DL and the counter electrode CF corresponding to one pixel. The columnar spacers SP are also formed such that they are arranged in parallel with both sides of the video signal line DL at portions enclosed by bold lines in FIG. 11.

In this embodiment, as shown in FIG. 11, although the number of columnar spacers SP is set to six for one pixel, the number is not limited to six. Although the columnar spacers SP are arranged at both side of the video signal line DL as pairs, they may be arranged at both sides in a staggered manner or in a random manner. Furthermore, although the columnar spacers SP have an elliptical plan shape, the columnar spacers SP may have other plan shapes, such as a circular shape, a quadrangular shape, a rhombus shape or the like.

The reason why the undesired leakage of light from the region between the video Signal line DL and the counter electrode C7 can be prevented with the constitutions of the respective embodiments of the present invention will be explained hereinafter.

The liquid crystal LC is present only at a portion between the video signal line DL and the counter electrode CT, that is, at a portion where no columnar spacers SP are present. Upon driving the liquid crystal LC, the transmission factor of light is changed and, hence, the smaller the region where the liquid crystal LC is present, the region where the transmission factor is changed, is also reduced so that the change of light transmission between the video signal line DL and the counter electrode CT is decreased. Accordingly, compared with the case where no columnar spacers SP are provided, the requirement for the optical density of the black matrix BM can be attenuated.

Furthermore, when the dielectric characteristics or the conductivity characteristics of the columnar spacers SP are higher than those of the liquid crystal LC, the electric field is formed in the columnar spacer SP more easily than in the liquid crystal LC. Accordingly, due to such an electric field between these electrodes, it becomes difficult to drive the liquid crystal LC. Therefore, light can be shielded easily even at portions where the columnar spacers SP are not present.

Since an ultraviolet-curable photosensitive resin is generally used as the material of the columnar spacers, it is difficult to control the above-mentioned electrical characteristics to desired values in an actual control. In accordance with this invention, such electrical characteristics are controlled by making use of the electrical characteristics of the particles RU contained in the columnar spacers SP.

Although the columnar spacers SP are formed on the color filter substrate (the other substrate SUB2), they may be formed on the active matrix substrate (one substrate SUB1) side. Due to such a constitution, the contrast and the luminance can be enhanced while preventing the occurrence of crosstalk.

Now, a summary of the manufacturing process of the liquid crystal display devices of the above-mentioned respective embodiments will be explained. First of all, as in the known process for forming the typical thin film transistor, the thin film transistor TFT made of amorphous silicon AS, the storage capacity Cstg, a group of electrodes including the pixel electrode PX, the source electrode SD1 and the counter electrode CT are formed on the glass substrate having a thickness of 0.7 mm or 1.1 mm which constitutes one substrate SUB1 by repeating film forming and patterning process. Furthermore, a plurality of video signal lines DL for applying given voltages to the above-mentioned group of electrodes by way of the thin film transistor TFT, the drain electrode SD2, the counter voltage signal line CL and a plurality of scanning signal lines GL and gate electrodes GT for controlling the conduction of the thin film transistor TFT are arranged in a matrix so as to form the active matrix substrate.

The thin film transistor TFT, a group of respective electrodes and respective wirings are coated with the insulation film GI and the protective film PSV. Thereafter, the orientation film material is coated, is baked and is subjected to rubbing treatment or light orientation treatment so as to provide the liquid crystal, orientation control function so that the orientation control layer ORI1 is obtained.

Furthermore, a photosensitive black resist is coated on a glass substrate having a thickness of 0.7 $\mu$m or 1.1 $\mu$m which constitutes the other substrate SUB2 and the resist is exposed with a photomask having a given pattern and then is subjected to developing and baking steps so as to form the black matrix. Then, using photosensitive red, green and blue resin resists, exposing, developing and baking steps are repeated in the same manner so as to form color filter layers FIL (red colored layer FIL (R), green colored layer FIL (G) and blue colored layer FIL (B)).

As the material of the columnar spacers, ultraviolet-curable resin resist containing spherical spacers (plastic beads) is used. On all of the color filter layers, the ultraviolet-curable resin resist containing the columnar spacer is coated, and then ultraviolet rays are irradiated to positions where the spacers are to be formed by way of a photomask having a given pattern and then the pattern is developed. Here, while stopping the developing time at the time that the unexposed portion is not removed, the resist is baked so as to form the black matrix BM, the protective film OC which covers the color filter layers FIL and the columnar spacers SP.

In case the dielectric constant characteristics and the conductivity characteristics of the columnar spacers are set to be higher than those of the liquid crystal, the dielectric constant characteristics and the conductivity characteristics of the spherical spacers mixed into the columnar spacer material are controlled. For example, the columnar spacer material may use spherical spacers which contain carbon black or metal particles in the inside or on the surface of the spherical spacers.

Since the top portions (distal end of the SUB1 side) of the columnar spacers SP are substantially flat, these columnar spacers SP are not formed in a normally tapered shape and have a literally column-like shape where the bottom portion and the top portion have a substantially equal area.

Furthermore, after forming the black matrix BM and the colored layers (color filters) FIL, a transparent ultraviolet-curable resin resist is coated and is baked to cover the entire surface of the black matrix BM and the colored layers FIL with the protective film OC, and again a transparent ultraviolet-curable resin resist is coated and the ultraviolet rays are irradiated at positions where the spacers are to be formed by way of a photomask having a desired pattern and the resin resist is developed and baked to obtain the columnar spacers SP.

Thereafter, orientation film material is coated on the color filter substrate and is baked to obtain the orientation film ORI2 having the desired liquid crystal orientation control function.

The columnar spacers SP may be formed on the active matrix substrate (SUB1) side. In this case, a transparent ultraviolet-curable resin resist is coated on the insulation film PSV of the active matrix substrate and the ultraviolet rays are irradiated at positions where the spacers are to be formed by way of a photomask having a desired pattern and the resin resist is developed and baked to obtain the columnar spacers SP.

Furthermore, the protective film PSV is piled up by the height of the columnar spacer SP and a resin resist for patterning is coated and then the ultraviolet rays are irradiated at positions where the columnar spacers SP are to be formed by way of a photomask having a desired pattern so as to carry out the patterning and then the protective film PSV is etched by dry etching. The columnar spacer SP portions and the protective film PSV are simultaneously formed by controlling the etching time.

The active matrix substrate and the color filter substrate manufactured in the above manner are made to face each other in an opposing manner. Then, their peripheral portions are fixedly secured to each other by means of an adhesive agent except for a liquid crystal inlet and a liquid crystal composition is filled in a gap defined between these two substrates, and then the liquid crystal inlet is sealed by a sealing member. Thereafter, the liquid crystal display device is obtained by means of a press, wherein the distance between two substrates is restricted by the columnar spacers so as to define a given cell gap.

The drive means of the liquid crystal display device to which the present invention is applied and specific product examples will be explained hereinafter.

Figure 13:
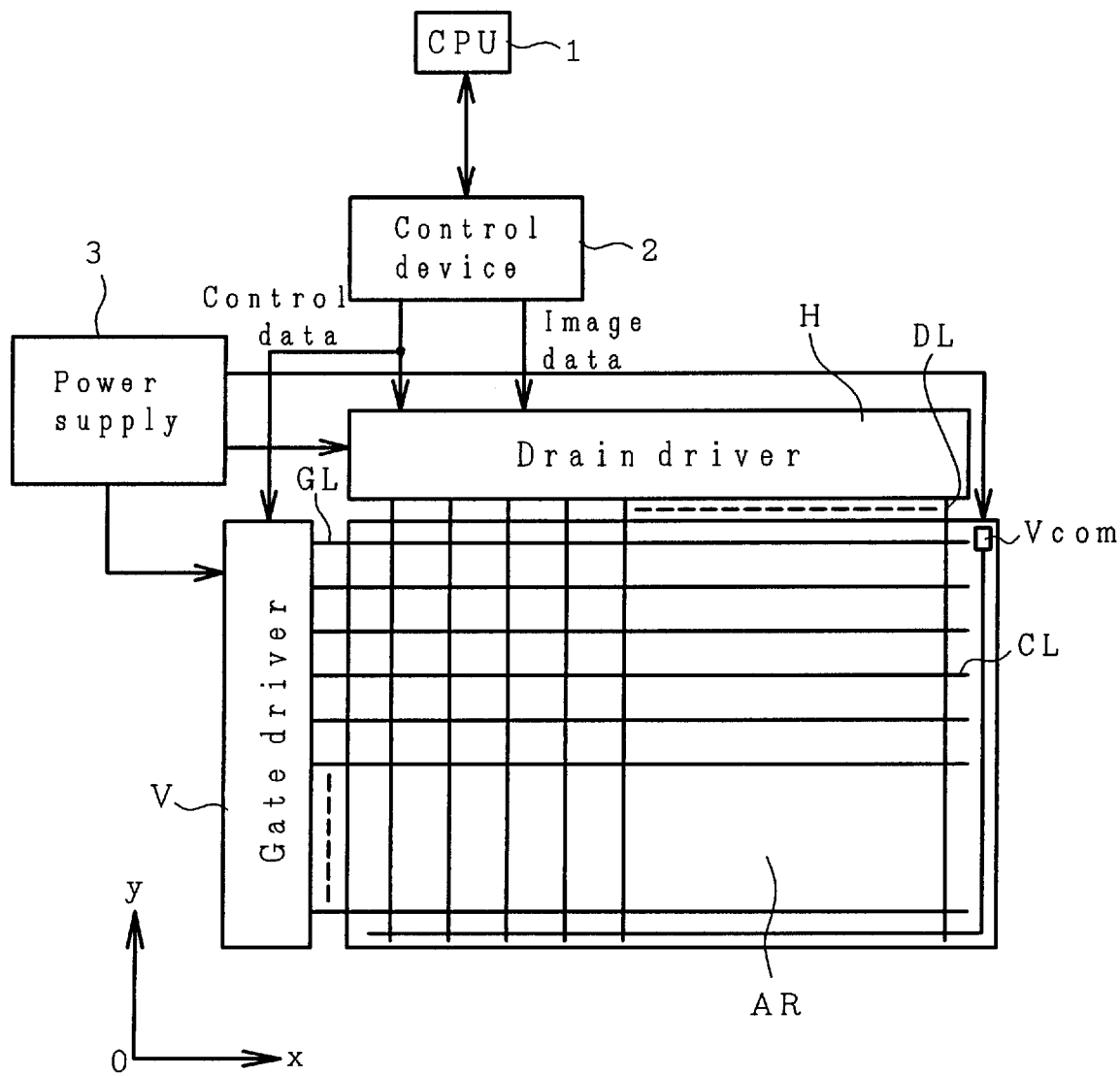
FIG. 13 is a block diagram of drive means of a liquid crystal display device to which the present invention is applied.

FIG. 13 is a block diagram of drive means for the liquid crystal display device to which the present invention is applied. In the liquid crystal display device, an image display portion is constituted by a plurality of pixels arranged in a matrix and each pixel is constituted such that the pixel can independently carry out modulation control of the transmitting light from a backlight (not shown in the drawings) which is disposed at the back portion of the liquid crystal display device.

On the active matrix substrate (SUB1), which is one of the constituent elements of the liquid crystal display device, the scanning signal lines GL and the counter voltage signal lines CL are formed, which extend in a x direction (row direction) within a valid pixel region and are arranged in parallel in a y direction (column direction), and the video signal lines DL are formed, which are insulated respectively from the scanning signal lines GL and the counter voltage lines CL and extend in the y direction and are arranged in parallel in the x direction. Here, unit pixels are formed in rectangular regions which are respectively surrounded by the scanning signal lines GL, the counter voltage signal lines CL and the video signal lines DL.

The liquid crystal display device is provided with a vertical scanning circuit V and a video signal drive circuit H as external circuits, wherein scanning signals (voltages) are supplied to the respective scanning signal lines GL in sequence by means of the vertical scanning circuit V, while video signals (voltages) are supplied to the video signal lines DL from a video signal drive circuit H following the timing of the scanning signals.

Electricity is supplied to the vertical scanning circuit V and the video signal drive circuit H from a liquid crystal drive power source circuit 3, and image information from a CPU1 is divided into display data and control signals by means of a controller 2 and inputted to the vertical scanning circuit V and the video signal drive circuit H.

Figure 14:
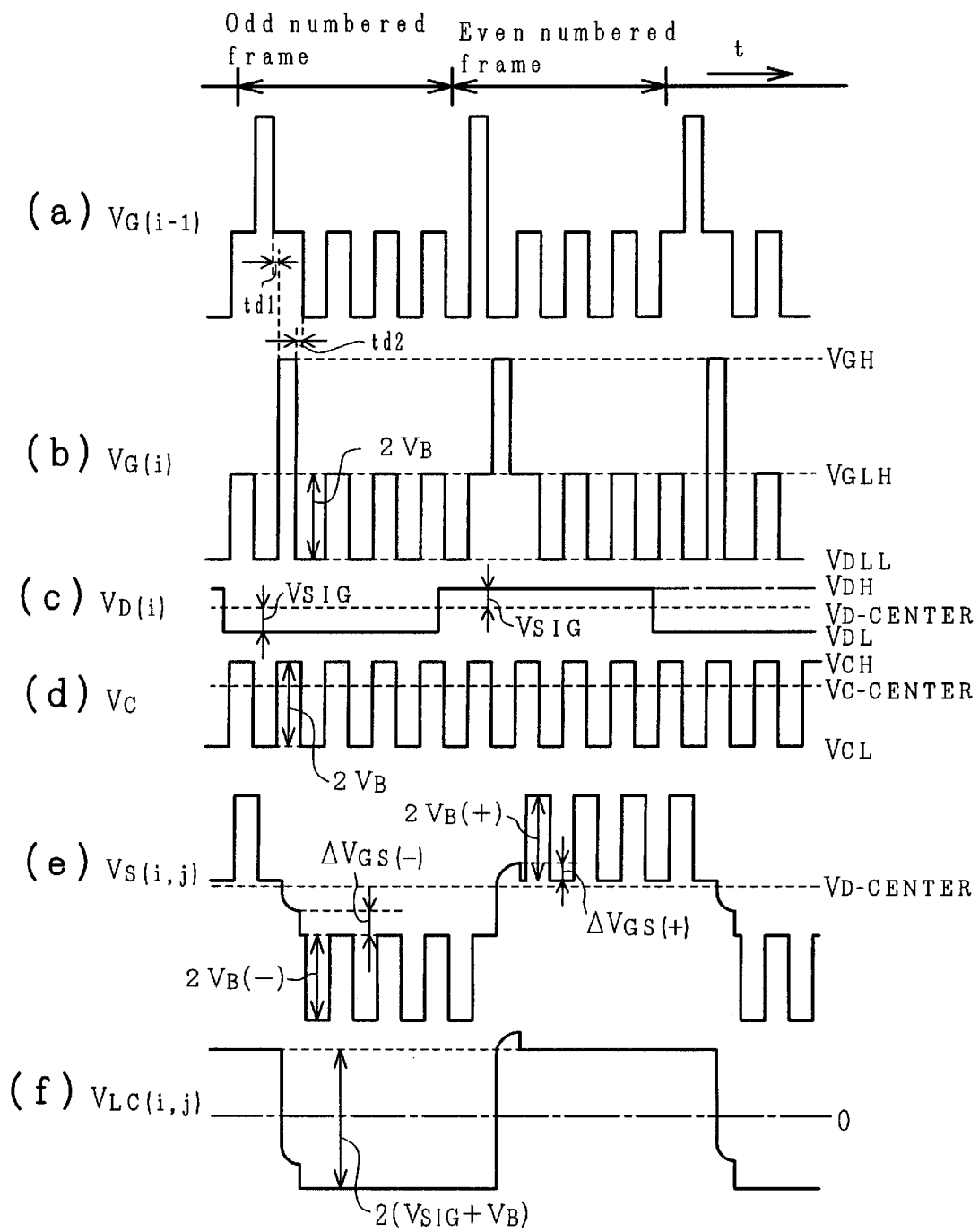
FIG. 14 is a diagram illustrating one example of drive waveforms of a liquid crystal display device to which the present invention is applied.

FIG. 14 a waveform diagram showing one example of the waveforms for driving the liquid crystal display device to which the present invention is applied. In the drawing, the counter voltage has an AC rectangular waveform and has two values VCH and VCL. In synchronism therewith, the non-selection voltage of the scanning signals VG (i-1) and VG (i) is changed into two values VCH and VCL for every scanning period. The amplitude of the counter voltage is set to be equal to the amplitude of the non-selection voltage. The video signal voltage has a value which is obtained by subtracting one-half the amplitude of the counter voltage from a voltage that is to be applied to the liquid crystal layer. The counter voltage may be a DC voltage. By employing an AC voltage, however, it is possible to lower the maximum amplitude of the video signal voltage and, hence, to employ a video signal driver circuit (signal side driver) having a decreased breakdown voltage.

Figure 15:
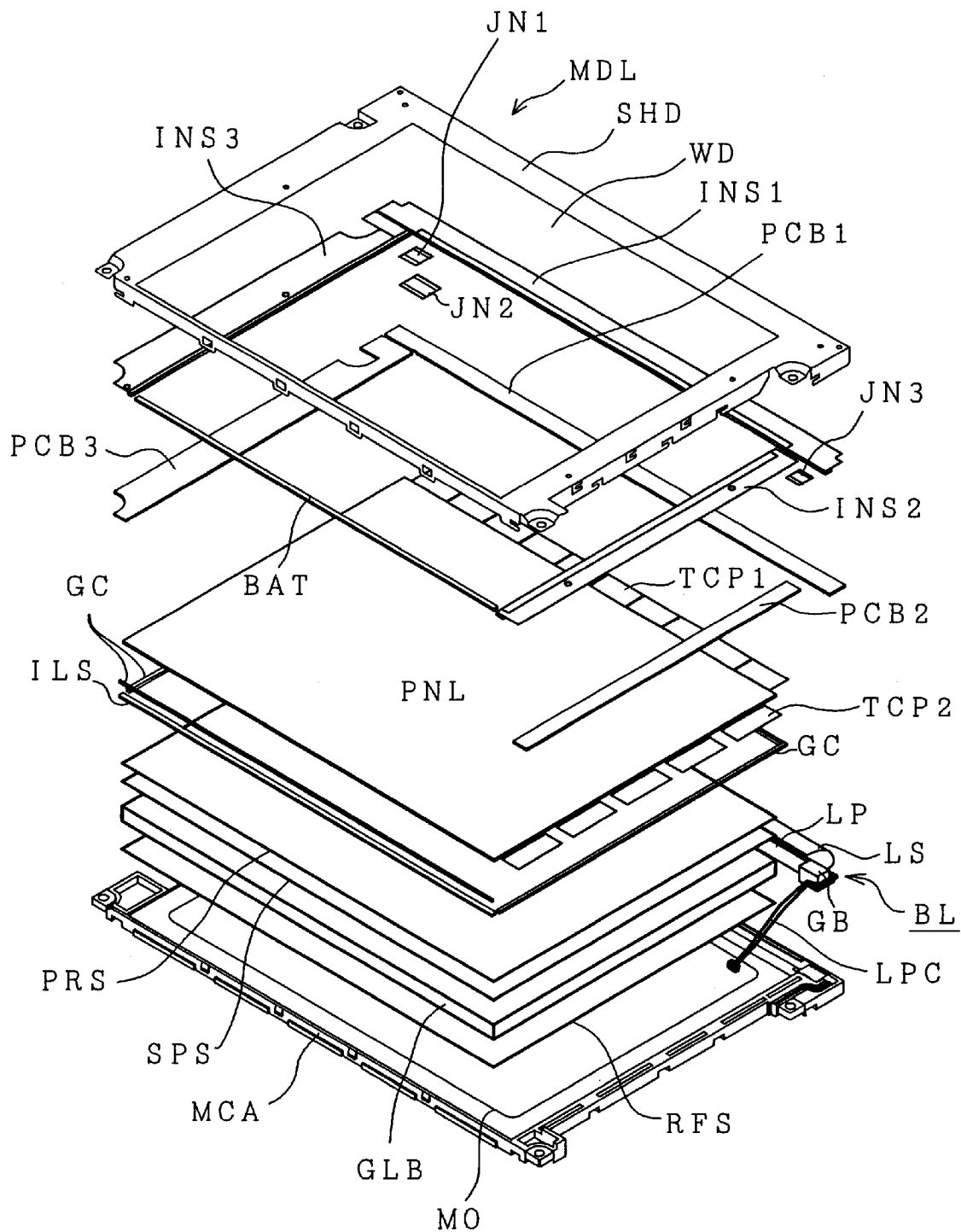
FIG. 15 is an exploded perspective view showing the entire constitution of a liquid crystal display device of the present invention.

FIG. 15 is an exploded perspective view showing the overall constitution of the liquid crystal display device of the present invention and the specific structure of the liquid crystal display device (hereinafter referred as a liquid crystal display module MDL which is integrally formed by a liquid crystal display panel made by combining two substrates SUB1, SUB2, drive means, a backlight, and other constituent members).

In the drawing, SHD denotes a shield case (or metal case) made of a metal plate, WD denotes a display window, INS1–INS3 denote insulation sheets, PCB1–PCB3 denote printed circuit boards which constitute drive means (PCB1 being a drain side circuit board or a printed circuit board for driving video signal lines, PCB2 being a gate side printed circuit board, PCB3 being an interface printed circuit board), JN1–JN3 denote joiners which electrically connect the printed circuit boards PCB1–PCB3 with each other, TCP1, TCP2 denote tape carrier packages, PNL denotes a liquid crystal panel, GC denotes a rubber cushion, ILS denotes a light shielding spacer, PRS denotes a prism sheet, SPS denotes a diffusion sheet, GLB denotes a light guide plate, RFS denotes a reflection sheet, MCA denotes a lower side case (molded frame) formed by integrated molding, MO denotes an opening of the lower case MCA, LP denotes a fluorescent tube, LPC denotes a lamp cable, GB denotes a rubber bushing which supports the fluorescent tube LP, BAT denotes a both sides adhesive tape, and BL denotes a back light made of a fluorescent tube or a light guide board or the like. The liquid crystal display module MDL is assembled by stacking the diffusion plate members in accordance with the arrangement shown in the drawing.

The liquid crystal display module MDL includes two kinds of storing and holding members for the lower case MCA and the shield case SHD and is constituted by combining the shield case SHD made of metal which stores and fixes the insulating sheets INS1–INS3, the circuit substrates PCB1–PCB3 and the liquid crystal panel PNL and the lower side case MCA which stores the backlight BL made of the fluorescent tube LP, the light guide plate GLB and the prism sheet PRS and the like.

An integrated circuit chip for driving respective pixels of the liquid crystal panel PNL is mounted on the printed circuit board PCB1 for driving the video signal lines. Furthermore, on the interface printed circuit board PCB3, an integrated circuit chip which receives video signals from external hosts and controls signals, such as timing signals, a timing converter TCON for generating clock signals by processing the timing and the like are mounted.

The clock signals generated by the timing converter are supplied to an integrated circuit chip mounted on the printed circuit board PCB1 for driving the video signal lines by way of clock signal lines CLL installed on the interface printed circuit board PCB3 and the printed circuit board PCB1 for driving the video signal lines.

The interface printed circuit board PCB3 and the printed circuit board PCB1 for driving the video signal line are made of multi-layered wiring boards and the above-mentioned clock signal lines CLL are formed as inner-layer wirings of the interface printed circuit board PCB3 and the printed circuit board PCB1 for driving the video signal line. To the liquid crystal panel PNL, the drain side printed circuit board PCB1 for driving the TFT, the gate side printed circuit board PCB2 and the interface printed circuit board PCB3 are connected by means of the tape carrier packages TCP1, TCP2. The printed circuit boards PCB1–PCB3 are connected with each other by means of joiners JN1, JN2 and JN3.

The liquid crystal panel PNL is the transverse electric field active matrix liquid crystal display device of the present invention and the device is provided with columnar spacers as explained in connection with the foregoing embodiments for maintaining the gap between two substrates at a given value.

Figure 16:
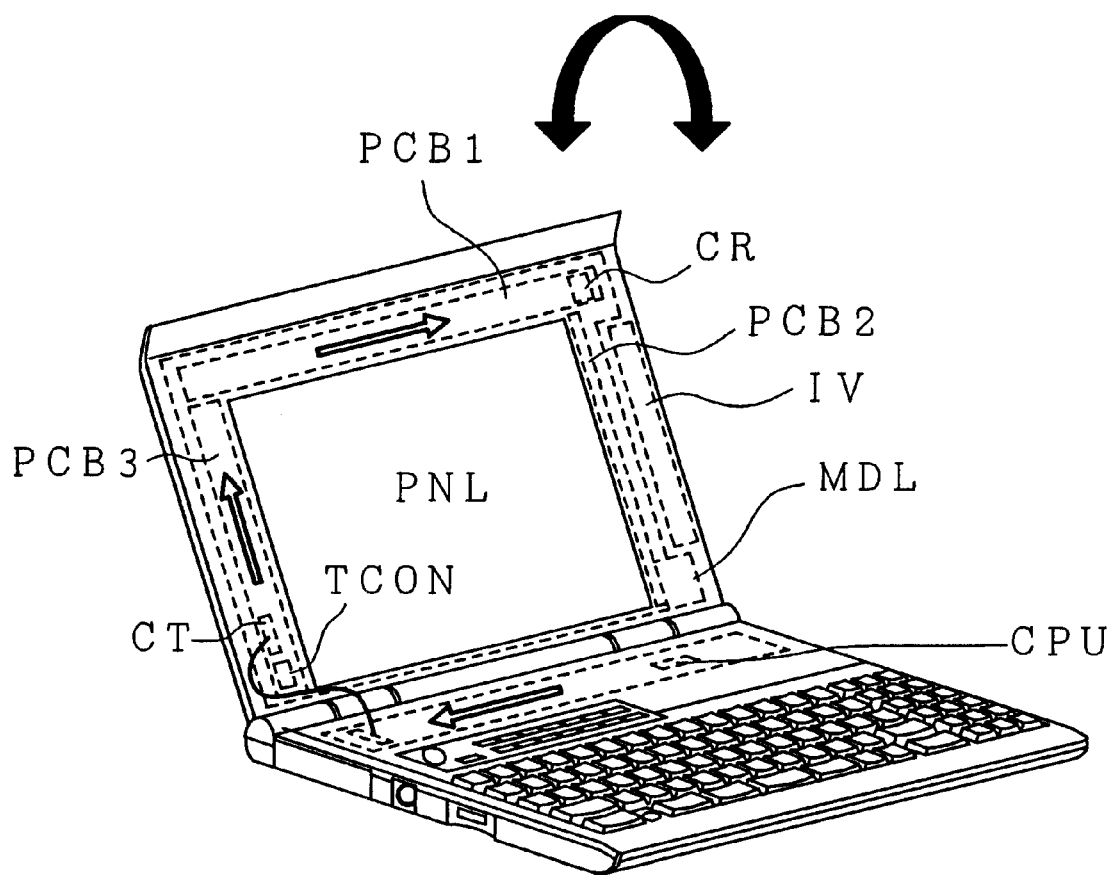
FIG. 16 is a perspective view of a notebook type computer as an example of an electronic device on which a liquid crystal display device of the present invention is mounted.

FIG. 16 is a perspective view of a notebook type computer as an example of electronic equipment on which the liquid crystal display device of the present invention is mounted. This notebook type computer (portable computer) is comprised of a keyboard part (body part) and a display part connected to the keyboard part by means of hinges. The keyboard part accommodates signal generating means such as a keyboard, a host (host computer), a CPU and the like, while the display part includes the liquid crystal panel PNL. Furthermore, on the peripheral portion of the liquid crystal panel PNL, the drive printed circuit board PCB1, the drive printed circuit board PCB2, the drive printed circuit board PCB3 on which a control chip TCON is mounted, and an inverter power source board which constitutes a backlight power source and the like are mounted.

The liquid crystal display module shown in FIG. 11 which is constituted by integrally assembling the liquid crystal display panel PNL, various printed circuit boards PCB1, PCB2, PCB3, the inverter power source board and the backlight is mounted on the notebook type computer.

Although, in the above-mentioned embodiments, the present invention has been applied to a so-called transverse electric field liquid crystal display device, the present invention is not limited to such devices and it is needless to say that the present invention is similarly applicable to other types of liquid crystal display devices where the cell gap must be maintained uniformly by mixing particles in the spacers.

As has been described heretofore, according to the fifth and sixth embodiments, by means of columnar spacers which are arranged between the video signal line and the counter electrode or are arranged such that they cover the region of the video signal line and the pixel electrode and particles having substantially the same size as the cell gap, which are disposed in the inside of the columnar spacers, the cell gap in the display screen can be formed uniformly and the luminance in the inside of the display screen is made uniform.

Furthermore, since the liquid crystal in the region between respective electrodes is partially excluded, the light which passes through the region defined between electrodes is hardly affected by the electric field generated between these electrodes. Accordingly, the amount of leakage of light in the region is minimized and the contrast and luminance are enhanced and the occurrence of crosstalk is prevented, thus obtaining a liquid crystal display device providing a high quality image display.

What is claimed is:

1. A liquid crystal display device comprising:
   a pair of substrates including a first substrate and a second substrate;
   a liquid crystal layer interposed between the pair of substrates;
   a color filter formed on a surface of said first substrate facing said liquid crystal layer and a black matrix interposed between the color filter and the first substrate;
   a first spacer formed at a position corresponding to the black matrix and extending toward the second substrate;
   a pixel electrode having a voltage applied thereto according to an image signal, a counter electrode having a predetermined voltage applied thereto, and a video signal line, each of the pixel electrode, the counter electrode and the video signal line being formed over the second substrate; and
   a second spacer formed at a position corresponding to the video signal line and extending toward the first substrate, a top face of the second spacer and an opposing top face of the first spacer being joined so that the first and second spacers delimit a gap between said pair of first and second substrates;
   wherein a specific resistance of the first spacer is smaller than a specific resistance of the second spacer.

2. A liquid crystal display device according to claim 1, wherein the specific resistance of the first spacer is set to less than $10^8$ Ωm and the specific resistance of the second spacer is set to not less than $10^8$ Ωm.

3. A liquid crystal display device according to claim 1, wherein the first spacer is formed of metal or organic polymer material containing carbon particles and the second spacer is formed of organic polymer based insulation material.

4. A liquid crystal display device comprising a liquid crystal panel which includes a pair of substrates, with at least one of said substrates being transparent, at least two kinds of color filters of different colors for color display and a black matrix interposed between the respective color filters which are formed on one of said substrates, a group of electrodes which includes signal wirings and common wirings formed on the other of said substrates, a layer made of a liquid crystal composition disposed between said substrates and having a dielectric anisotropy, and an orientation control layer for making the molecular arrangement of the layer of liquid crystal composition be arranged in a given direction, polarizing plates, which are laminated while having their respective polarizing axes disposed perpendicular to said substrates, and drive means which applies drive voltages to said electrodes, and said liquid crystal display device including an electrode arrangement in which a group of said electrodes apply voltages mainly in parallel with an interface between said orientation control layer and said layer of liquid crystal composition, and columnar spacers containing particles having substantially the same size as a desired thickness of said layer of liquid crystal composition being provided to at least one of said substrates, and the dielectric characteristics and the conductivity characteristics of said columnar spacers containing said particles being set to be higher than those of said liquid crystal composition, and said columnar spacers being formed on a portion between said signal wiring and said common wiring disposed at a position hidden by said black matrix.

5. A liquid crystal display device according to claim 4, wherein said particles contained in said columnar spacers are made of conductive beads.

6. A liquid crystal display device according to claim 4, wherein said columnar spacers are made of the same material as a protection film formed on an upper layer of said color filter formed on said one substrate.

7. A liquid crystal display device according to claim 4, wherein a protective film made of organic material containing conductive spacers is formed on said other substrate.

* * * * *